(12) United States Patent
Choi et al.

(10) Patent No.: US 7,812,918 B2
(45) Date of Patent: Oct. 12, 2010

(54) LIQUID CRYSTAL DISPLAY DEVICE AND METHOD FOR FABRICATING THE SAME

(75) Inventors: Young Seok Choi, Gyeongsangbuk-do (KR); Yu Ho Jung, Gyeongsangbuk-Do (KR); Sang Yong Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 117 days.

(21) Appl. No.: 12/003,586

(22) Filed: Dec. 28, 2007

(65) Prior Publication Data

US 2009/0015780 A1 Jan. 15, 2009

(30) Foreign Application Priority Data

Jul. 12, 2007 (KR) ............... 10-2007-0070253
Oct. 1, 2007 (KR) ............... 10-2007-0098684

(51) Int. Cl.
G02F 1/1339 (2006.01)

(52) U.S. Cl. ............... 349/156; 349/56; 349/84; 349/155

(58) Field of Classification Search ............... 349/56, 349/84, 155, 156
See application file for complete search history.

(56) References Cited

U.S. PATENT DOCUMENTS 5,748,266 A    5/1998    Kodate
5,880,797 A    3/1999    Yamada et al.
6,061,105 A *  5/2000    Nakagawa ............... 349/40
6,411,360 B1   6/2002    Matsuyama et al.
7,456,909 B2 * 11/2008   Park ............... 349/40

FOREIGN PATENT DOCUMENTS

CN           1690790 A     11/2005
CN           1892382 A     1/2007
KR    10-2007-0059303      6/2007

* cited by examiner

*Primary Examiner*—Jennifer Doan
(74) *Attorney, Agent, or Firm*—Morgan, Lewis & Bockius LLP

(57) ABSTRACT

A liquid crystal display device includes first and second substrates facing each other; gate lines and data lines formed on the first substrate such that the gate lines and the data lines intersect each other to define pixel regions; thin film transistors formed at respective intersections of the gate lines and the data lines; a black matrix layer formed on the second substrate such that the black matrix layer corresponds to a region other than the pixel regions; color filter layers extending in an extension direction of the data lines in respective pixel regions; a liquid crystal layer interposed between the first and second substrates; first column spacers formed on one of the first and second substrates such that each first column spacer corresponds to an associated one of the gate lines or to a channel region of an associated one of the thin film transistors.

27 Claims, 34 Drawing Sheets

Liquid Crystal Amount (dot)

Liquid Crystal Amount (dot)

Liquid Crystal Amount (dot)

Liquid Crystal Amount (dot)

LIQUID CRYSTAL DISPLAY DEVICE AND METHOD FOR FABRICATING THE SAME

This application claims the benefit of the Korean Patent Application No. 10-2007-070253, filed on Jul. 12, 2007, and Korean Patent Application No. 10-2007-098684, filed on Oct. 1, 2007, both of which are hereby incorporated by reference as if fully set forth herein.

BACKGROUND OF THE INVENTION

1. Field of the Invention

The present invention relates to a liquid crystal display device, and more particularly, to a liquid crystal display device and a method for fabricating the same, which reduces the amount of liquid crystal material used in the liquid crystal display device in accordance with a particular column spacer formation process.

2. Background of the Related Art

With the progress of an information-dependent society, the demand for various display devices has increased. To meet such demands, efforts have recently been made to research flat panel display devices such as liquid crystal display (LCD) devices, plasma display panels (PDPs), electro-luminescent display (ELD) devices, vacuum fluorescent display (VFD) devices, and the like. Some types of such flat panel display devices are being practically applied to various appliances for display purposes. In particular, LCDs have been increasingly substituted cathode ray tubes (CRTs) in mobile image display devices because LCDs have superior picture quality, low weight, thin profile, and low power consumption. Thus, LCDs are currently most widely used for mobile image display devices. Various applications of LCDs are being developed in association with not only mobile image display devices, such as monitors of notebook computers, but also monitors of TVs to receive and display broadcasting signals, and monitors of laptop computers. Successful application of such LCDs to diverse image display devices depends on whether or not the LCDs can realize the desired high picture quality including high resolution, high brightness, large display area, and the like, while maintaining the desired characteristics of light weight, thin profile, and low power consumption.

Hereinafter, a related art LCD device will be described with reference to the annexed drawings.

FIG. 1 is an exploded perspective view illustrating a related aft twisted nematic (TN) mode LCD device. As shown in FIG. 1, the related art TN mode LCD device includes a first substrate 1 and a second substrate 2 assembled onto each other such that a certain space is defined between the first and second substrates 1 and 2. The LCD device also includes a liquid crystal layer 3 sealed in the space between the first and second substrates I and 2. The structure including all the first substrate 1, second substrate 2 and liquid crystal layer 3 is called a "liquid crystal panel."

The structure of the LCD device will now be described in more detail. The first substrate I includes a plurality of gate lines 4 arranged in one direction while being uniformly spaced apart from one another, and a plurality of data lines 5 arranged in a direction perpendicular to the gate lines 4 while being uniformly spaced apart from one another. The gate lines 4 and data lines 5 define pixel regions P. Pixel electrodes 6 are arranged on the first substrate 1 at respective pixel regions P. Thin film transistors T are formed at intersections of the gate lines 4 and data lines 5, respectively. Each thin film transistor T applies a data signal on an associated one of the data lines 5 to an associated one of the pixel electrodes 6 in accordance with a signal on an associated one of the gate lines 4. The second substrate 2 includes a black matrix layer 7 for blocking incidence of light to regions other than the pixel regions P. The second substrate 2 also includes R, G, and B color filter layers 8 respectively formed at regions corresponding to the pixel regions P, and adapted to express color tones, and a common electrode 9 formed to cover the color filters 8, and adapted to render an image. At each pixel region P, the liquid crystal layer 3 interposed between the first and second substrates 1 and 2 is oriented in accordance with an electric field generated between the associated pixel electrode 6 and the common electrode 9. In accordance with the orientation degree of the liquid crystal layer 3, the amount of light passing through the liquid crystal layer 3 is determined. Thus, a corresponding image can be expressed. Although not shown, ball spacers or column spacers are formed between the first and second substrates 1 and 2, to maintain a cell gap for the liquid crystal layer 3.

Such an LCD device is called a "TN mode LCD device." Since a TN mode LCD device has a drawback of a narrow viewing angle, an in-plane switching (IPS) mode LCD device has been developed to overcome the drawback of the TN mode LCD device. Hereinafter, a related art IPS mode LCD device, which is driven in an IPS mode, will be described. FIG. 2 is a plan view illustrating a related art IPS mode LCD device. FIG. 3 is a cross-sectional view taken along the line I-I' of FIG. 2. As shown in FIGS. 2 and 3, the related art IPS mode LCD device mainly includes a first substrate 30, a second substrate 40 assembled onto the first substrate 30 such that a certain space is defined between the first and second substrates 30 and 40, and a liquid crystal layer 55 sealed between the two substrates 30 and 40. The structure including all the first substrate 30, second substrate 40, and liquid crystal layer 55 is called a "liquid crystal panel." The related art IPS mode LCD device has the same structure as the above-mentioned general LCD device of FIG. 1, except that an overcoat layer is substituted for the common electrode of the second substrate in the general LCD device.

This structure will now be described in more detail. In the related art IPS mode LCD device, gate lines 31 and data lines 32 are arranged in an array region on the first substrate 30 such that the gate lines 31 and data lines 32 intersect each other, to define pixel regions. TFTs are formed at respective intersections of the gate lines 31 and data lines 32. In each pixel region, pixel electrodes 33 and common electrodes 35a are alternately formed. The common electrodes 35a extend in a direction parallel to the gate lines 31 while being branched from a common line 35 formed on the same layer as the gate lines 31. Each TFT includes a gate electrode 31a protruded from the associated gate line 31, a semiconductor layer 34 covering the gate electrode 31a, and a source electrode 32a and a drain electrode 32b formed at opposite sides of the semiconductor layer 34, respectively. The source electrode 32a protrudes from the associated data line 32. The drain electrode 32b is spaced apart from the source electrode 32a by a predetermined distance. A gate insulating film 36 is also formed over the resultant surface of the first substrate 30 including the gate lines 31 and common lines 35 to insulate the metal lines from each other. A passivation film 37 is formed over the gate insulating film 36 including the data lines 32. The second substrate 40, which faces the first substrate 30, includes a black matrix layer 41 for shielding non-pixel regions (gate line, data line and TFT regions) other than the pixel regions, color filter layers 42 respectively formed in the pixel regions while sequentially and repeatedly containing R, G, and B pigments. A plurality of column spacers 50 are formed in desired regions on the overcoat layer 43, to maintain a desired cell gap between the first and second substrates 30 and 40. The column spacers 50 are arranged uniformly spaced apart from one another while corresponding to the gate lines 31. When the first and second substrates 30 and 40 are assembled, the column spacers 50 support the first and second substrates 30 and 40 such that a desired cell gap is maintained between the first and second substrates 30 and 40.

As mentioned above, in both the related art TN mode LCD device and the related art IPS mode LCD device, the space between the facing first and second substrates is adjusted through the above-mentioned column spacers. However, all the column spacers, which are adapted to maintain a desired cell gap, have the same structure, and the structure of the column spacers is simply shaped to correspond to the cell gap between the first and second substrates. For this reason, there is a problem in a touch operation for a test; in which the surface of one of the first and second substrates is rubbed in a certain direction. That is, there may be defects caused by the touch operation in that the substrate cannot be rapidly recovered from a shifted state to an original state, or a depression stain such as a trace is formed in a region where a pressure is locally applied to the substrate. Thus, various luminous defects may be observed after the touch operation. In addition, although liquid crystals are filled in a space between the first and second substrates, the filling of the liquid crystals causes a large burden in terms of process time and expense.

The above-described related art LCD devices have the following problems. Since liquid crystals should be completely filled in a space between the first and second substrates, except for the column spacers adapted to maintain a desired vertical gap between the first and second substrates, a large amount of liquid crystal material is needed. In association with the manufacture of panels, in particular, efforts to reduce the use amount of liquid crystal materials have been made because the use of liquid crystals causes a large burden in terms of process time and expense. Furthermore, with an LCD device including column spacers configured to simply maintain a desired vertical gap between the first and second substrates, display defects may be generated in a test involving a touch operation, in which the surfaces of the substrates are rubbed, or local application of a pressure to the substrates.

SUMMARY OF THE INVENTION

Accordingly, the present invention is directed to a liquid crystal display device and a method for fabricating the same that substantially obviate one or more problems due to limitations and disadvantages of the related art.

An object of the present invention is to provide a liquid crystal display device which maintains a desired vertical gap between opposite substrates, prevents a substrate shift phenomenon from occurring between the substrates when the substrates are subjected to a touch, or prevent generation of display defects caused by application of a pressure, and reduces the amount of liquid crystal material used, and a method for fabricating the liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises first and second substrates facing each other; gate lines and data lines formed on the first substrate such that the gate lines and the data lines intersect each other to define pixel regions; thin film transistors formed at respective intersections of the gate lines and the data lines; a black matrix layer formed on the second substrate such that the black matrix layer corresponds to a region other than the pixel regions; color filter layers extending in an extension direction of the data lines in respective pixel regions; a liquid crystal layer interposed between the first and second substrates; first column spacers formed on one of the first and second substrates such that each first column spacer corresponds to an associated one of the gate lines or to a channel region of an associated one of the thin film transistors to maintain a cell gap between the first and second substrate; and spacer patterns formed on one of the first and second substrates such that each spacer pattern corresponds to at least one of an associated one of the gate lines and an associated one of the data lines, thereby forming a first gap between the spacer pattern and the other substrate facing the spacer pattern, and reducing an amount of liquid crystals filled between the first and second substrates.

In another aspect of the present invention, a method for fabricating a liquid crystal display device, comprising: forming gate lines and data lines on a first substrate such that the gate lines and the data lines intersect each other to define pixel regions, and forming thin film transistors at respective intersections of the gate lines and the data lines; forming a black matrix layer on the second substrate such that the black matrix layer corresponds to a region other than the pixel regions; forming color filter layers on a second substrate such that the color filter layers extend in an extension direction of the data lines in respective pixel regions; forming first column spacers on one of the first and second substrates such that each first column spacer corresponds to an associated one of the gate lines or to a channel region of an associated one of the thin film transistors while maintaining a cell gap between the first and second substrate; forming spacer patterns on one of the first and second substrates such that each spacer pattern corresponds to at least one of an associated one of the gate lines and an associated one of the data lines, thereby forming a first gap between the spacer pattern and the other substrate facing the spacer pattern, and reducing an amount of liquid crystals filled between the first and second substrates; and bonding the first and second substrates such that a liquid crystal layer is formed between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
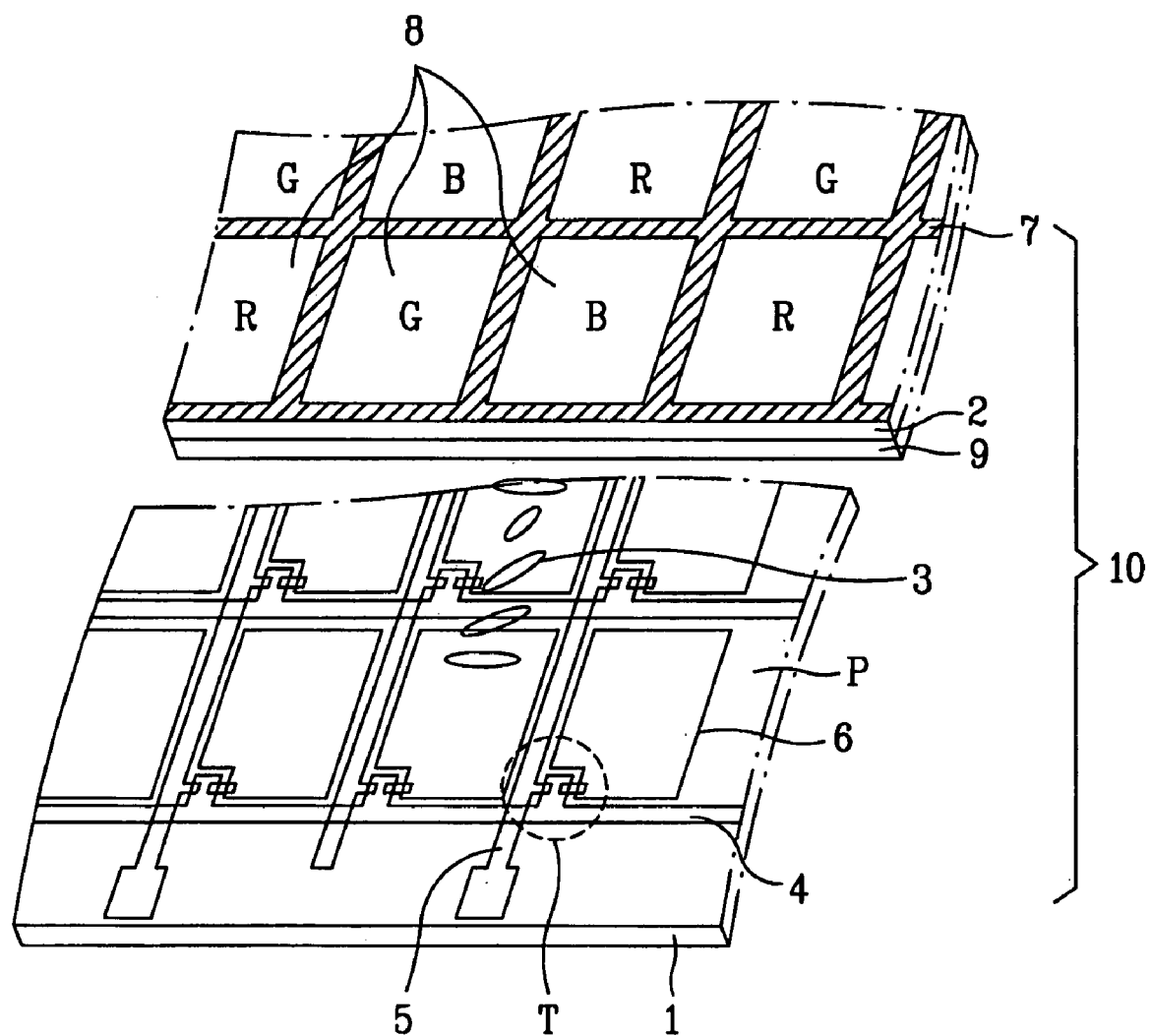
FIG. 1 is an exploded perspective view illustrating a related art twisted nematic (TN) mode liquid crystal display (LCD) device.
Figure 2:
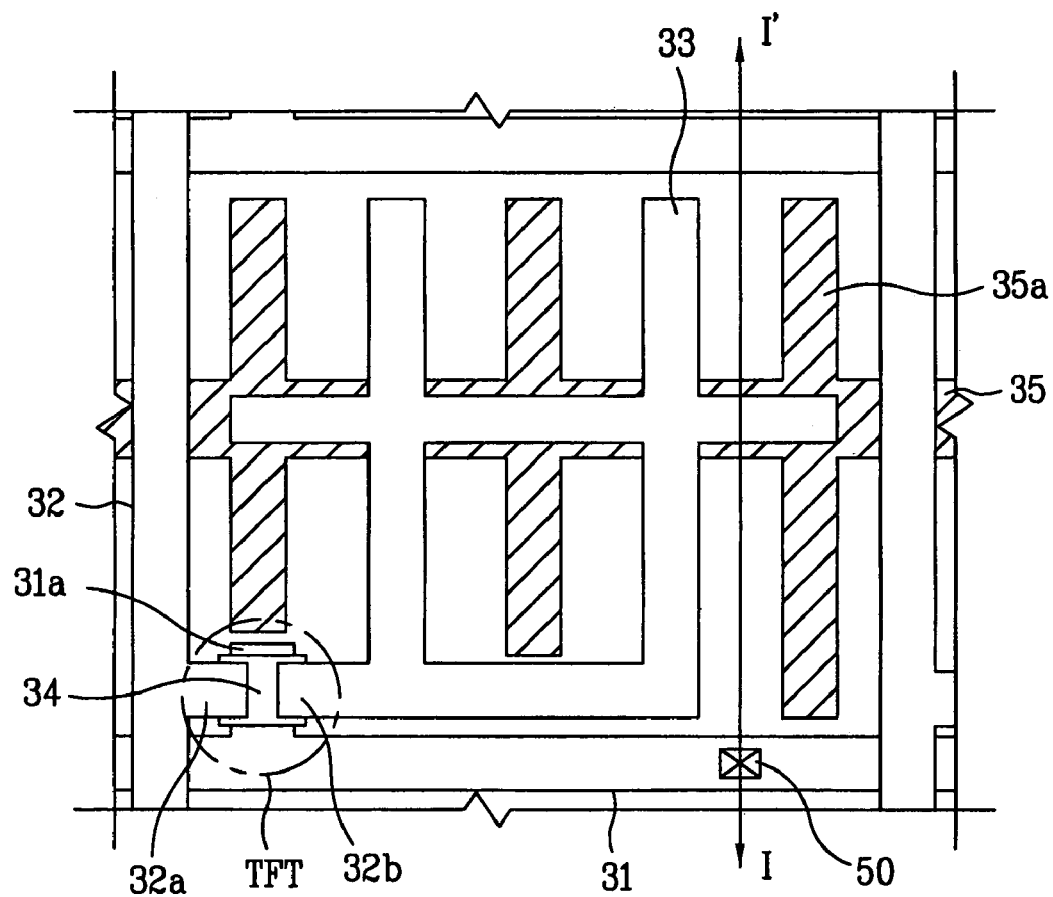
FIG. 2 is a plan view illustrating a related art in-plane switching (IPS) mode LCD device.
Figure 3:
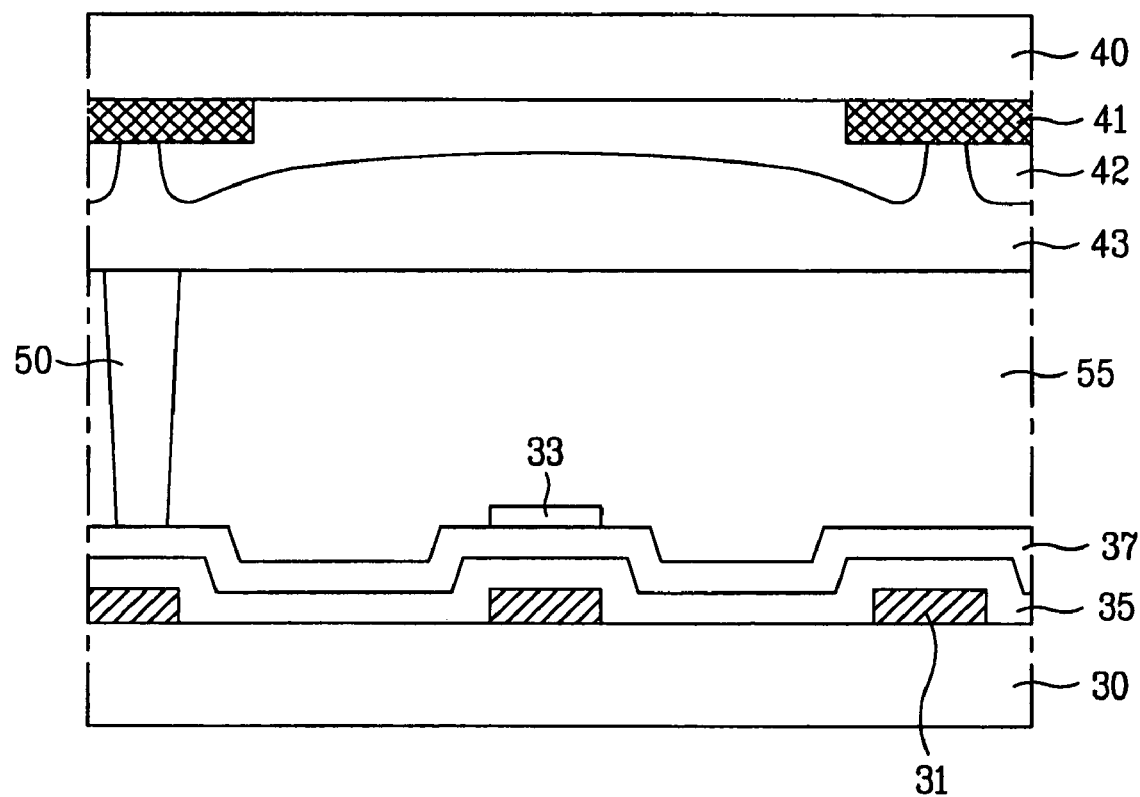
FIG. 3 is a cross-sectional view taken along line I-I' of FIG. 2.
Figure 4:
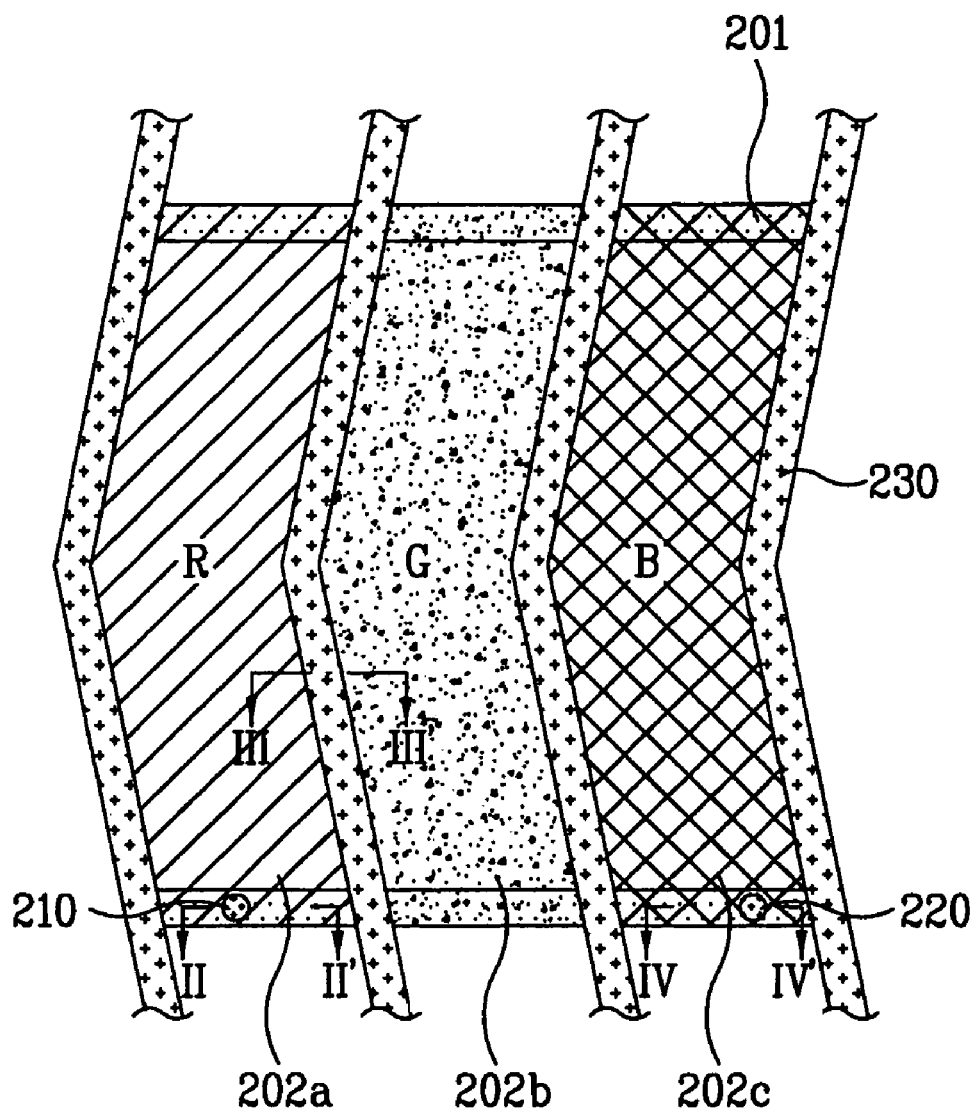
FIG. 4 is a plan view illustrating one pixel of an exemplary liquid crystal display (LCD) device according to the present invention, and column spacers and spacer patterns formed to correspond to the pixel.
Figure 5:
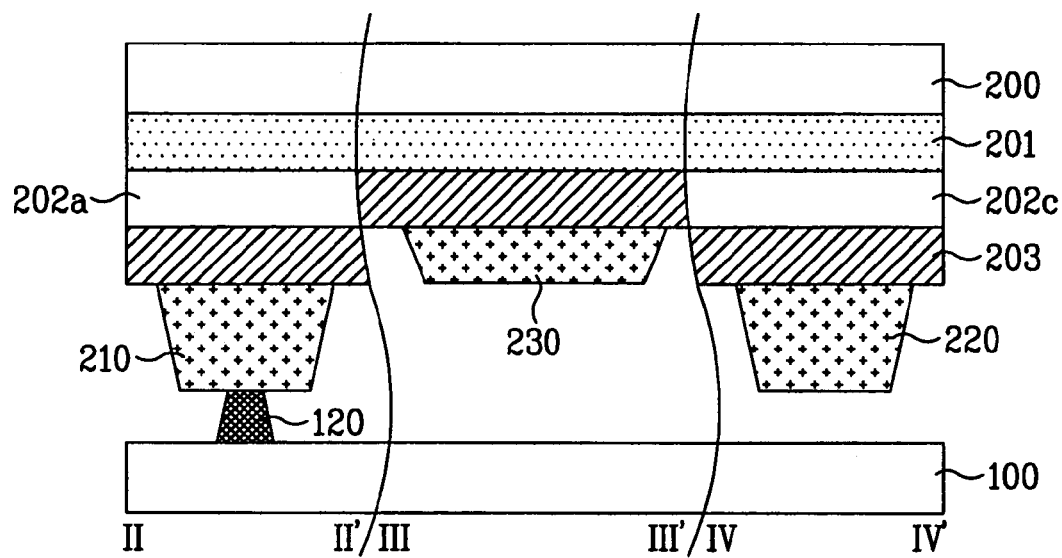
FIG. 5 is a cross-sectional view taken along lines II-II', III-III', and IV-IV' of FIG. 4.

FIG. 4 is a plan view illustrating one pixel of an exemplary liquid crystal display (LCD) device according to the present invention, and column spacers and spacer patterns formed to correspond to the pixel. FIG. 5 is a cross-sectional view taken along lines II-II', III-III', and IV-IV' of FIG. 4. As shown in FIGS. 4 and 5, each pixel of the LCD device according to the present invention includes R, G, and B sub-pixels. Each sub-pixel includes a gate line ("151" in FIG. 6) and a data line ("155a" in FIG. 6) intersecting each other. The gate line is shown extended in a horizontal direction. In each sub pixel, the data line is obtusely bent with respect to the gate line at a region, where the sub pixel is divided into halves, to have a vertically-symmetrical structure. If necessary, the data line may be formed to be perpendicular to the gate line, or may be formed to have repeatedly-bent portions in a zigzag pattern. The region between adjacent gate lines and adjacent data lines is defined as a pixel region.

Generally, the above-described LCD device according to the present invention includes first and second substrates 100 and 200, which face each other, gate lines and data lines formed on the first substrate 100 such that they intersect each other to define pixel regions, a black matrix layer 201 formed on the second substrate 200, to shield regions (gate lines and data lines) other than the pixel regions, color filter layers 202a, 202b, and 202c formed on the second substrate 200 to shield at least the pixel regions, an overcoat layer 203 formed on the second substrate 200 to planarize the resultant surface of the second substrate 200 including the black matrix layer 201 and color filter layer 202, first and second column spacers 210 and 220 formed to correspond to certain portions of the black matrix layer 201, and spacer patterns 230 formed on the black matrix layer 201. Each first column spacer 210 is in contact with a protrusion 120 formed on the first substrate 100. The protrusion 120 has, at an upper surface thereof contacting the first column spacer 210, a contact area relatively smaller than that of the first column spacer 210. Accordingly, the first column spacer 210 and protrusion 120 are in contact with each other, with an area corresponding to the area of the upper surface of the protrusion 120. Each first column spacer 210 and each second column spacer 220 have the same height. Each spacer pattern 230 has a height relatively shorter than the first and second column spacers 210 and 220.

The second column spacer 220 corresponds to a region defined on the first substrate 100 at a level lower than a region corresponding to the first column spacer 210 because the first column spacer 210 corresponds to the protrusion 120. Accordingly, although the second column spacer 220 has the same height as the first column spacer 210, it is spaced apart from the first substrate 100. If necessary, the first and second column spacers 210 and 220 may be formed to correspond to regions arranged on the first substrate 100 at the same levels, respectively, while corresponding to regions arranged on the second substrate 200 at different levels, respectively. For instance, the first column spacer 210 may be formed in a region where at least three layers, for example, the black matrix layer 201, color filter layers 202a, 202b, or 202c, and overcoat layer 203, are overlapped, whereas the second column spacer 220 may be formed in a region where two layers, for example, the black matrix layer 201 and overcoat layer 203, overlap. In this case, the first and second column spacers 210 and 220 correspond to regions of different levels on the second substrate 200, respectively.

Thus, after the formation of the first and second column spacers 210 and 220 and the spacer patterns 230, the first and second substrates 100 and 200 are assembled to face each other, each first column spacer 210 comes into contact with a facing surface of the first substrate 100 (namely, the protrusion 120), each second column spacer 220 faces the first substrate 100 while being spaced apart from the first substrate 100, and each spacer pattern 230 faces the first substrate 100 while being spaced apart from the first substrate 100 by a distance longer than that of the second column spacer 220. Although the first column spacers 210 and second column spacers 220 have been illustrated as being formed on the black matrix layer 201 while corresponding to the gate lines, and the protrusions 120 have been illustrated as being formed to correspond to respective first column spacers 210, particular patterns, for example, the protrusions 120, may be dispensed with by making each first column spacer 210 correspond to a region defined on the first substrate 100 such that the region has a level relatively higher than other regions on the first substrate 100. Each first column spacer 210 maintains a desired gap between the first and second substrates 100 and 200 in an assembled state of the first and second substrates 100 and 200. Accordingly, the first column spacer 210 is referred to as a "gap-maintaining spacer." The second column spacers 220 come into contact with the first substrate 100 when a pressing pressure is applied to the first substrate 100 or second substrate 200, thereby sharing the gap Maintaining function with the first column spacers 210. In accordance with this function, each second column spacer 220 may be referred to as a "depression-preventing column spacer." Where the first column spacers 210 (gap-maintaining column spacers) are used alone without the second column spacers 220, the first column spacers 210 may be deformed when the pressing pressure applied to the first column spacers 210 increases severely. Even after the pressing pressure is released, the first column spacers 210 are difficult to be recovered to an original state thereof. Thus, the second column spacers 220 prevent the generation of the depression defects. Since the spacer patterns 230 are formed on the black matrix layer 201 of the second substrate 200 while corresponding to the data lines, it reduces the amount of liquid crystal material filled between the first and second substrates 100 and 200 can be reduced by the volume occupied by the spacer patterns 230. If necessary, the second column spacers 220 may be formed by the spacer patterns 230 having a height corresponding to that of the second column spacers 220 such that the spacer patterns 230 have both the depression preventing function and the liquid crystal amount reducing function. Meanwhile, the overcoat layer 203 is formed over the resultant surface of the second substrate 200 including the black matrix layer 201 and color filter layers 202a, 202b, and 202c. If necessary, the overcoat layer 203 may be dispensed with. A common electrode (not shown) made of a transparent metal may be formed over the overcoat layer 203.

Figure 6:
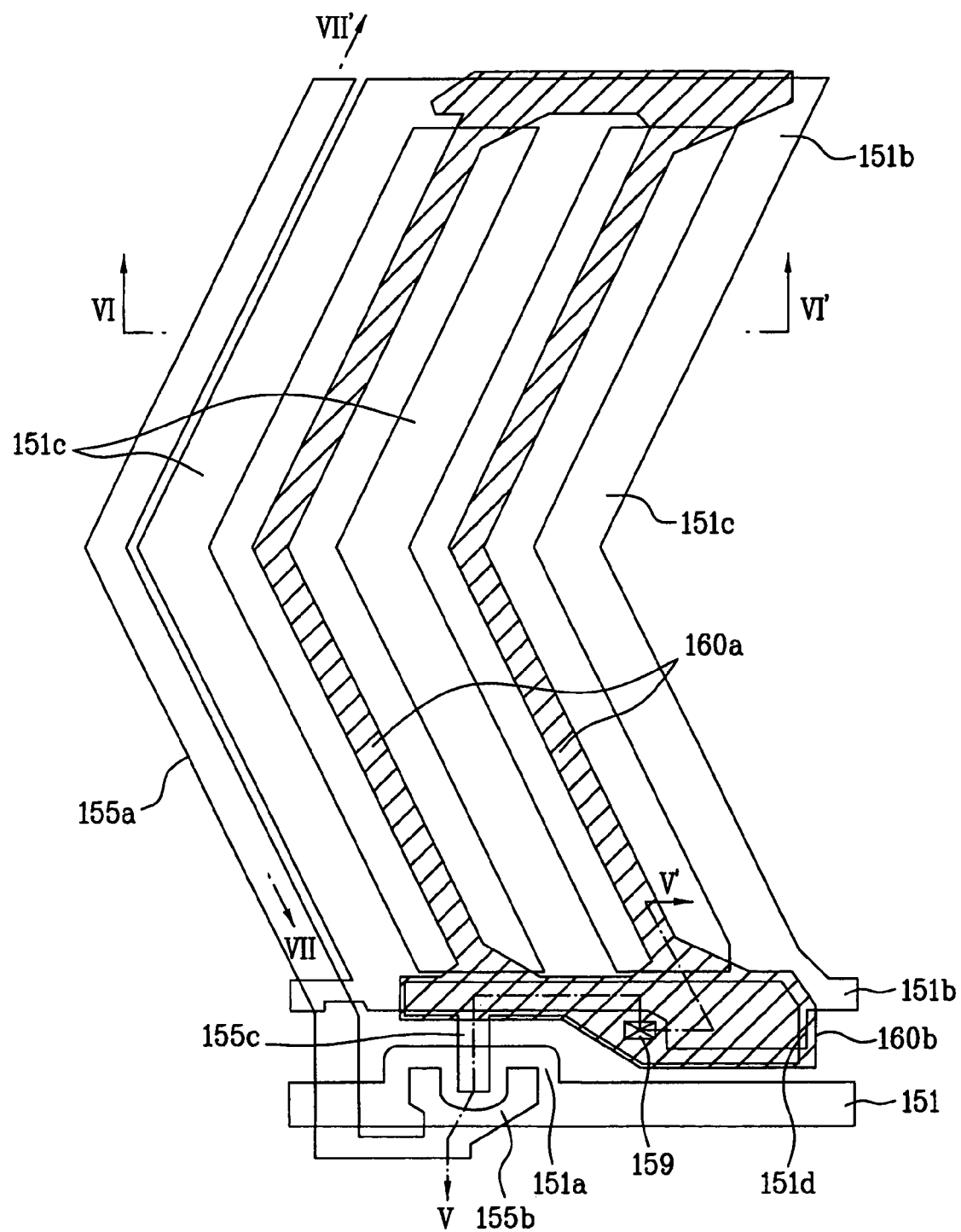
FIG. 6 is a plan view illustrating an LCD device according to a first exemplary embodiment of the present invention.
Figure 7:
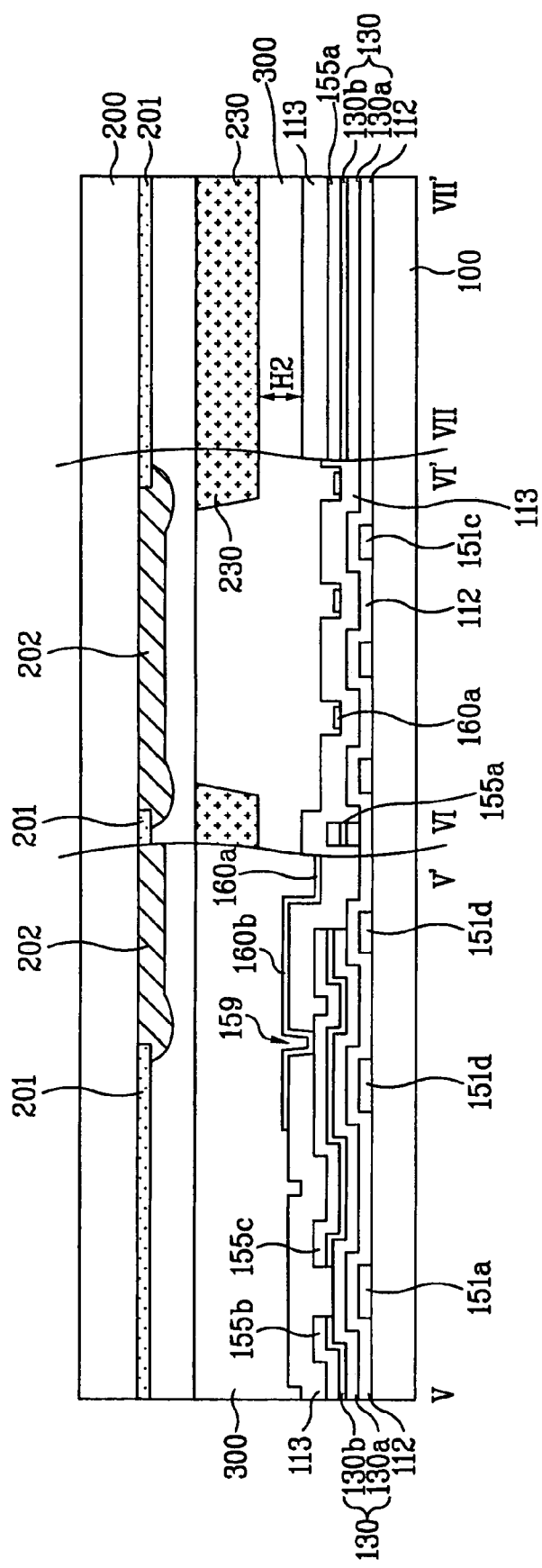
FIG. 7 is a cross-sectional view taken along lines V-V', VI-VI', and VII-VII' of FIG. 6.
Figure 8:
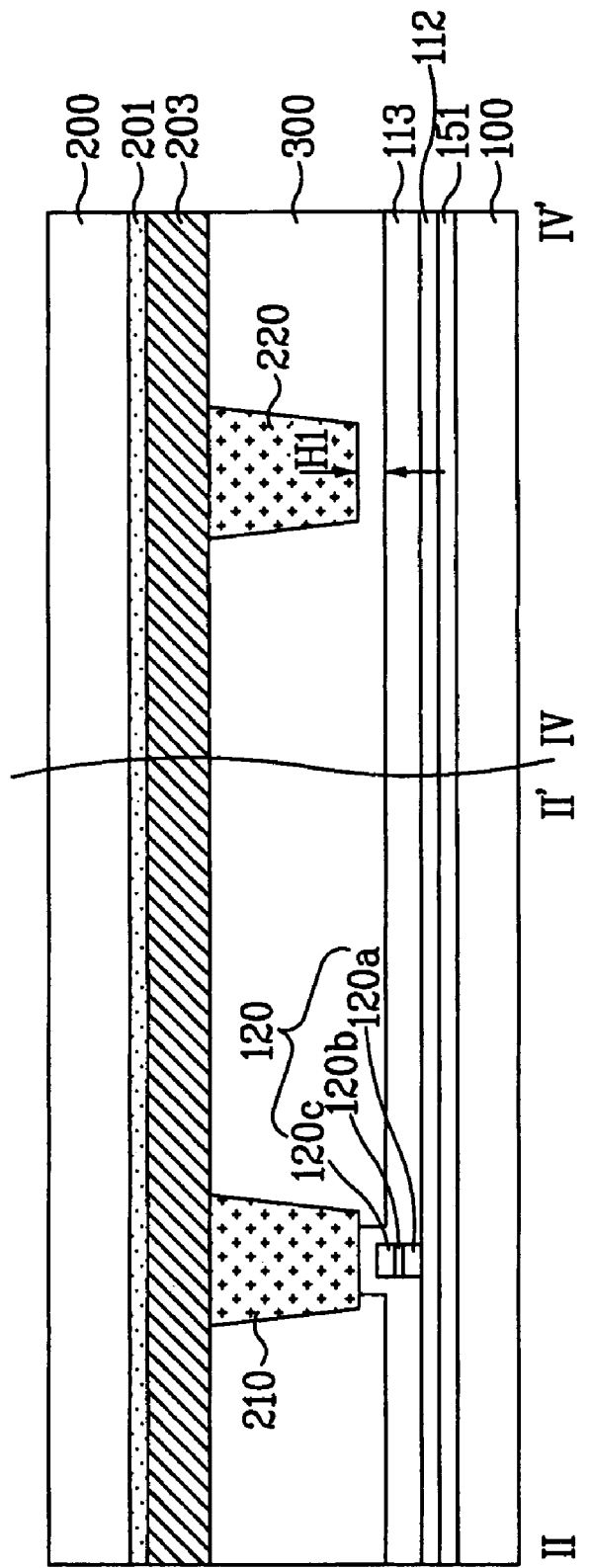
FIG. 8 is a cross-sectional view taken along lines II-II' and IV-IV' of FIG. 4, to illustrate first column spacers (gap-maintaining spacers) and second column spacers (depression-preventing column spacers) in the LCD device according to the first exemplary embodiment of the present invention.

Hereinafter, exemplary embodiments of the LCD device according to the present invention and a method for fabricating the same will now be described in conjunction with various modes. FIG. 6 is a plan view illustrating an LCD device according to a first exemplary embodiment of the present invention. FIG. 7 is a cross-sectional view taken along lines V-V', VI-VI', and VII-VII' of FIG. 6. FIG. 8 is a cross-sectional view taken along lines II-II' and IV-IV' of FIG. 4, to illustrate first column spacers (gap-maintaining spacers) and second column spacers (depression-preventing column spacers) in the LCD device according to the exemplary first embodiment of the present invention.

As shown in FIGS. 6 to 8, the LCD device according to the first exemplary embodiment of the present invention includes first and second substrates 100 and 200, which face each other, gate lines 151 and data lines 155a formed on the first substrate 100 such that they intersect each other, to define pixel regions, a black matrix layer 201 formed on the second substrate 200, to correspond to regions other than the pixel regions, and color filter layers 202 formed on the second substrate 200 in-the same direction as the data lines 155a such that the color filter layers 202 include at least the associated pixel regions. The LCD device also includes first column-spacers 210 formed on the second substrate 200 to correspond to the gate lines 151, while having a first height such that each first column spacer 210 is in contact with a surface region defined on the first substrate 100 facing the first column spacer 210, spacer patterns 230 formed on the second substrate 200 to correspond to the data lines 155a, while having a second height (less then the first height) such that each spacer pattern 230 is spaced apart from a surface region defined on the first substrate 100 facing the spacer pattern 230, and a liquid crystal layer 300 sealed between the first and second- substrates 100 and 200. The LCD device further includes second column spacers 220 formed on the second substrate 200 to correspond to the gate lines 151, while having a height larger than the second height, but shorter than the first height, such that each second column spacer 220 is spaced apart from a surface region defined on the first substrate 100 facing the spacer pattern 230. In the case illustrated in FIG. 8 (showing cross-sections taken along lines II-II' and IV-IV' of FIG. 4), the first column spacers 210 and the second column spacers 220 have the same height. In this case, the first column spacers 210 correspond to regions where protrusions 120 formed on the first substrate 100 are arranged, respectively. In detail, the first column spacers 210 are in contact with the surface of a passivation film 113 formed over the first substrate 100 to face the first column spacers 210. The second column spacers 220 are spaced apart from the surface of the passivation film 113 by a first spacing H1. Also, the spacer patterns 230 are spaced apart from the surface of the passivation film 113 by a second spacing H2 larger than the first spacing H1.

In the illustrated case, the first column spacers 210 are formed corresponding to the gate lines 151 via the protrusions 120. However, if necessary, the first column spacers 210 may be formed corresponding to thin film transistors (TFTs) formed on the first substrate 100 to have a height larger than other regions on the first substrate 100. In this case, each first column spacer 210 is formed to be arranged on the passivation film 113 in a region where a U-shaped source electrode 155b and a drain electrode 155c surrounded by the source electrode 155b are arranged, such that the first column spacer 210 extends across the source and drain electrodes 155b and 155c. In this case, the contact area between the first column spacer 210 and the passivation film 113 can be reduced. As the contact area is reduced, a reduction in the frictional force generated during a touch operation is achieved, so that the first column spacer 210 can be easily recovered to an original state thereof. Accordingly, touch defects can be prevented. In addition, in the illustrated case, the spacer patterns 230 are formed to correspond to the data lines 155a. If necessary, spacer patterns 230 corresponding to the gate lines may be further formed. In either case, it is preferred, in terms of the flowability of liquid crystals that the spacer patterns 230 be spaced apart from the first and second column spacers 210 and 220. Also, the spacer patterns 230 are formed within a region defined between left and right boundaries of the black matrix layer 201, to prevent the spacer patterns 230 from extending into the pixel regions. Each spacer pattern 230 may have a width equal to or larger than 5 μm, but equal to or smaller than a value obtained by adding 2 μm to the width of the black matrix layer 201, "black matrix layer width+2 μm", (namely, 5 μm≦spacer pattern width≦(black matrix layer width+2 μm)). Preferably, each spacer pattern 230 is formed to be arranged inside the left and right boundaries of the black matrix layer 201 by about 3 to 10 μm.

The lateral width of the black matrix layer 201 may vary in accordance with the substrate area. In the case of, for example, a 17" model having a black matrix layer width of 30 μm, accordingly, each spacer pattern 230 may be formed to be arranged inside each boundary of the black matrix layer by about 3 to 8.5 μm. As the substrate area increases, the area occupied by each spacer pattern 230 may increase. Accordingly, the spacing of each spacer pattern 230 from each boundary of the black matrix layer 201 can be adjusted in accordance with the substrate size. Even in the case, in which substrates having a large area are used, the spacer patterns 230 are formed inside the black matrix layer 201 to enable the black matrix layer 201 to shield regions where abnormal orientation of liquid crystals occurs along the boundaries of the spacer patterns 230. Meanwhile, the protrusions 120 may be made of a laminated structure including an amorphous silicon layer 120a, an impurity layer 120b, and a data line metal layer 120c. In the illustrated case, a structure formed by a 4-mask process is shown. In the 4-mask process, a semiconductor layer, which includes the amorphous silicon layer 120a and the impurity layer 120b, and the data line metal layer 120c are patterned using the same mask. In a 5-mask process, in which the semiconductor layer and the data line metal layer are individually patterned, the protrusions 120 may be formed from the semiconductor layer or the data line metal layer, or may be formed from the illustrated laminated structure.

The configuration of each pixel region will now be described with reference to FIG. 6. A common line 151b is formed to extend in parallel to the gate line 151 corresponding to the pixel region. A gate electrode 151a is protruded from the gate line 151 toward the pixel region. A U-shaped source electrode 155b is protruded from the data line 155a corresponding to the pixel region while overlapping with the gate electrode 151a. A drain electrode 155c is also formed such that it is spaced apart from the source electrode 155b while being partially surrounded by the source electrode 155b. Common electrodes 151c are branched from the common line 151b. Pixel electrodes 160a are branched from a second storage electrode 160b electrically connected to the drain electrode 155c via a contact hole 159. The common electrodes 151c and pixel electrodes 160a are alternately arranged. The second storage electrode 160b overlaps a first storage electrode 151d formed integrally with the common line 151b. The drain electrode 155c overlaps the second storage electrode 160b in a region where the contact hole 159 is formed. The drain electrode 155c is electrically connected to the second storage electrode 160b via the contact hole 159. A gate insulating film 112 is interposed in the form of an interlayer between the first storage electrode 151b and the drain electrode 155c in the pixel region, to form a storage capacitor. The drain electrode 155c and second storage electrode 160b, which are formed on different layers, respectively, are in contact with each other via the contact hole 159. The contact hole 159 is formed as the passivation film 133 is removed from a region corresponding to a desired portion of the drain electrode 155c. The common electrodes 151c and pixel electrodes 160a extend parallel to the data line 155a. That is, the common electrodes 151c and pixel electrodes 160a are formed in the form of a straight line or a zigzag line in accordance with the extension direction of the data line 155a.

The TFT has a channel defined in a region between the U-shaped source electrode 155b and the drain electrode 155c. Accordingly, the channel has a U-shaped structure extending along the U-shaped inner surface of the source electrode 155b. Thus, the TFT includes the gate electrode 151a protruded from the gate line 151, the U-shaped source electrode 155b protruded from the data line 155a, and the drain electrode 155c spaced apart from the U-shaped source electrode 155b while being surrounded by the U-shaped source electrode 155b. A semiconductor layer 130 is also formed beneath the data line 155a, source electrode 155b, and drain electrode 155c, and beneath the channel region between the source electrode 155b and the drain electrode 155c. The semiconductor layer 130 is made of a laminated structure including an amorphous silicon layer 130a and an n+ layer (impurity layer) 130b laminated over the amorphous silicon layer 130a. The n+ layer (impurity layer) 130b is eliminated in the channel region, namely, the region between the source electrode 155b and the drain electrode 155c. The semiconductor layer 130 may be selectively formed only beneath the source and drain electrodes 155b and 155c and beneath the region between the source and drain electrodes 155b and 155c (using a 5-mask process). In regions other than the channel region, the semiconductor layer 130 may be formed beneath the data line 155a, source electrode 155b and drain electrode 155c (using a 4-mask process). Although the source electrode 155b and channel of the LCD device have been described as having a U-shaped structure, the source electrode 155b in the LCD device according to the present invention may be protruded from the data line 155a in the form of a "–" shape, an "L" shape, or other shapes.

The gate line 151, common line 151b, and common electrodes 151c are formed of the same metal on the same layer. The gate insulating film 112 is interposed as an interlayer between the gate line 151 and the semiconductor layer 130. The passivation film 113 is interposed as an interlayer between the data line 155a and the pixel electrodes 160a.

On the second substrate 200, which faces the first substrate 100, the black matrix layer 201 is formed to correspond to regions (gate line and data line regions) other than the pixel regions. The color filter layers 202 are also formed on the second substrate 200 such that the color filter layers 202 correspond to at least the associated pixel regions. The overcoat layer 203 is also formed over the resultant surface of the second substrate 200 including the black matrix layer 201 and color filter layers 202, to planarize the surface of the second substrate 200. The black matrix layer 201 may further extend to shield regions where the TFTs are arranged.

The black matrix layer 201 may be formed in regions where the first column spacers 210, second column spacers 220, gate lines 151, common lines 151b, or first storage electrodes 15 Id are arranged. In the illustrated case, each first column spacer 210 and each second column spacer 220 are formed on the second substrate 200 such that they have the same height. In this case, protrusions 120 are formed on the first substrate 100, to form a stepped structure on the first substrate 100. As the first column spacers 210 correspond to respective protrusions 120 on the first substrate 100, the first column spacers 210 and the second column spacers 220 have different relations with the first substrate 100. Under the condition in which the protrusions 120 are eliminated, similar effects as described above can be obtained by adjusting the heights of each first column spacer 210 and each second column spacer 220 such that the height of each second column spacer 220 is shorter than the height of each first column spacer 210.

The spacer patterns 230 are formed to be smaller than the first and second column spacers 210 and 220. For example, when the first spacing H1 between each second column spacer 220 and the facing surface of the first substrate 100 (namely, the passivation film), is about 4,000 to 7,000 Å, the second spacing H2 between each spacer pattern 230 and the facing surface of the first substrate 100 is about 7,000 to 15,000 Å. The first spacing is calculated, taking into consideration the height of the protrusion 120 corresponding to the first column spacer 210.

In this case, in a touch operation, in which the surface of the first substrate 100 or second substrate 200 is rubbed, only the first column spacers 210 are maintained in a state of contacting the associated protrusions 120 or TFTs on the first substrate 100. Since the contact area of the first column spacers 210 is small, and thus, the resultant frictional force is small, the first column spacers 210 can easily be recovered to an original state thereof. Accordingly, a non-uniformity of black brightness caused by a touch operation can be prevented.

In a pressing test involving application of a pressure of a certain level or more, only the first column spacers 210 are maintained in a state of contacting the associated protrusions 120 or TFTs on the first substrate 100 at an early stage. As the applied pressure increases, the second column spacers 220 additionally come into contact with the corresponding regions on the first substrate 100 so that the contact area increases. As a result, the pressing pressure can be dispersed. In addition, the amount of liquid crystal material filled between the first and second substrates 100 and 200 can be reduced by the volume occupied by the spacer patterns 230. Each of the first and second column spacers 210 and 220 may have a horizontal cross-section of various shapes including a circular shape, and a polygonal shape such as a square shape. It is advantageous to form the first and second column spacers 210 and 220 to have a circular or regular polygonal cross-sectional shape, taking into consideration the alignment margin required in the formation process.

Figure 9A:
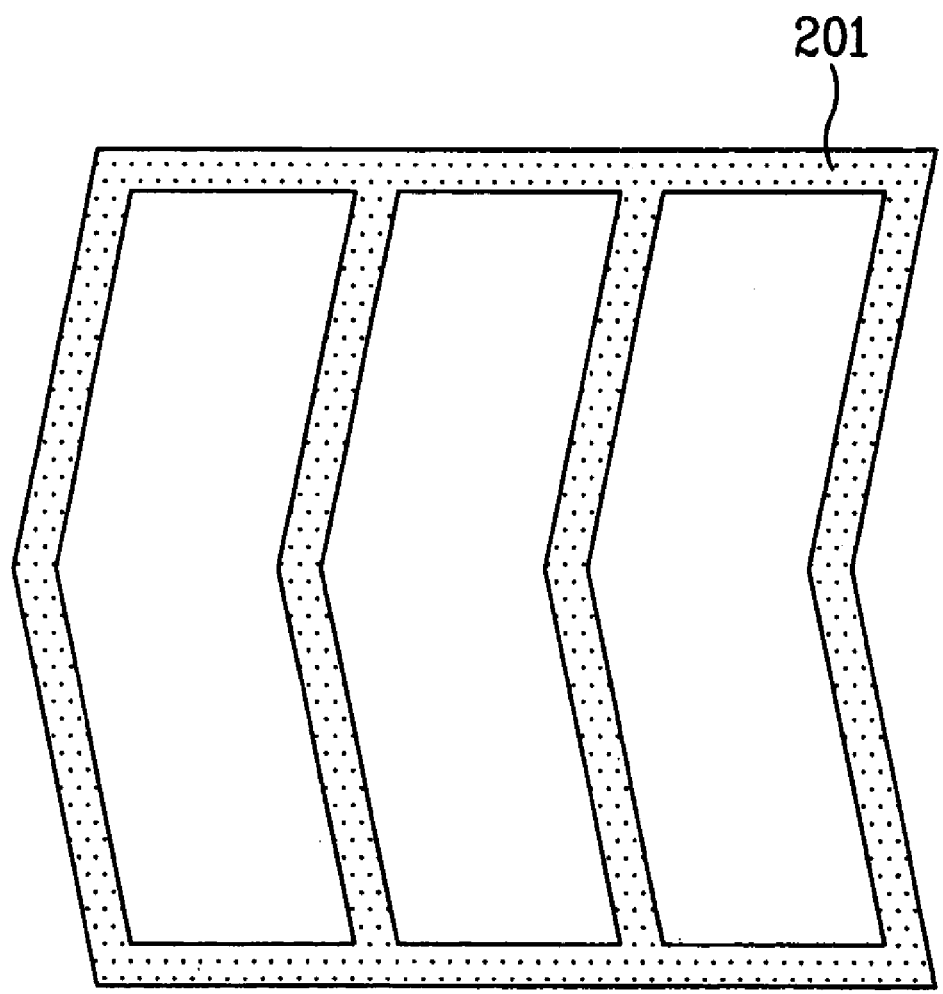
FIGS. 9A to 9C are plan views illustrating formation processes conducted on a second substrate in the LCD device according to the first exemplary embodiment of the present invention.
Figure 9B:
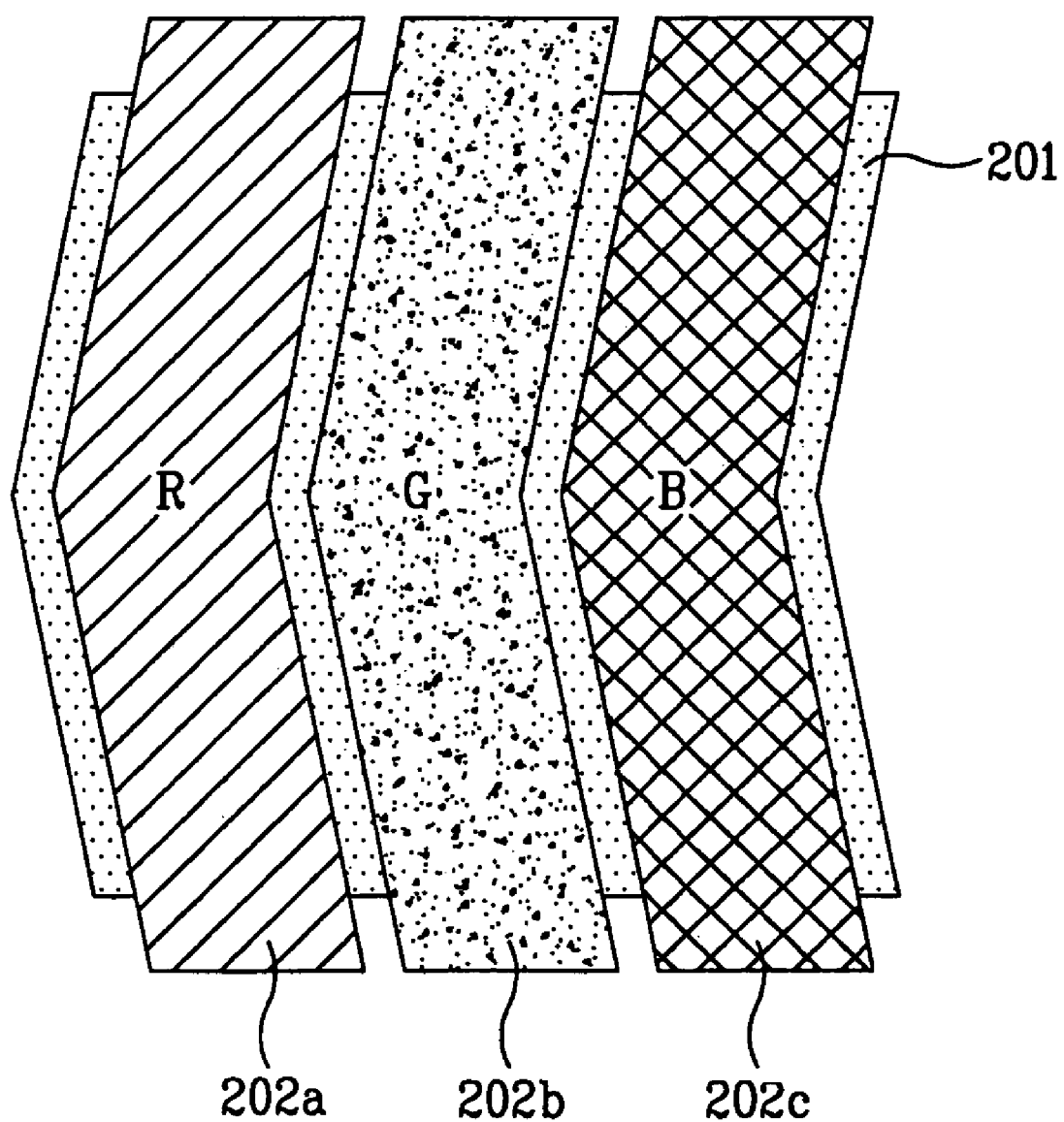
Figure 9C:
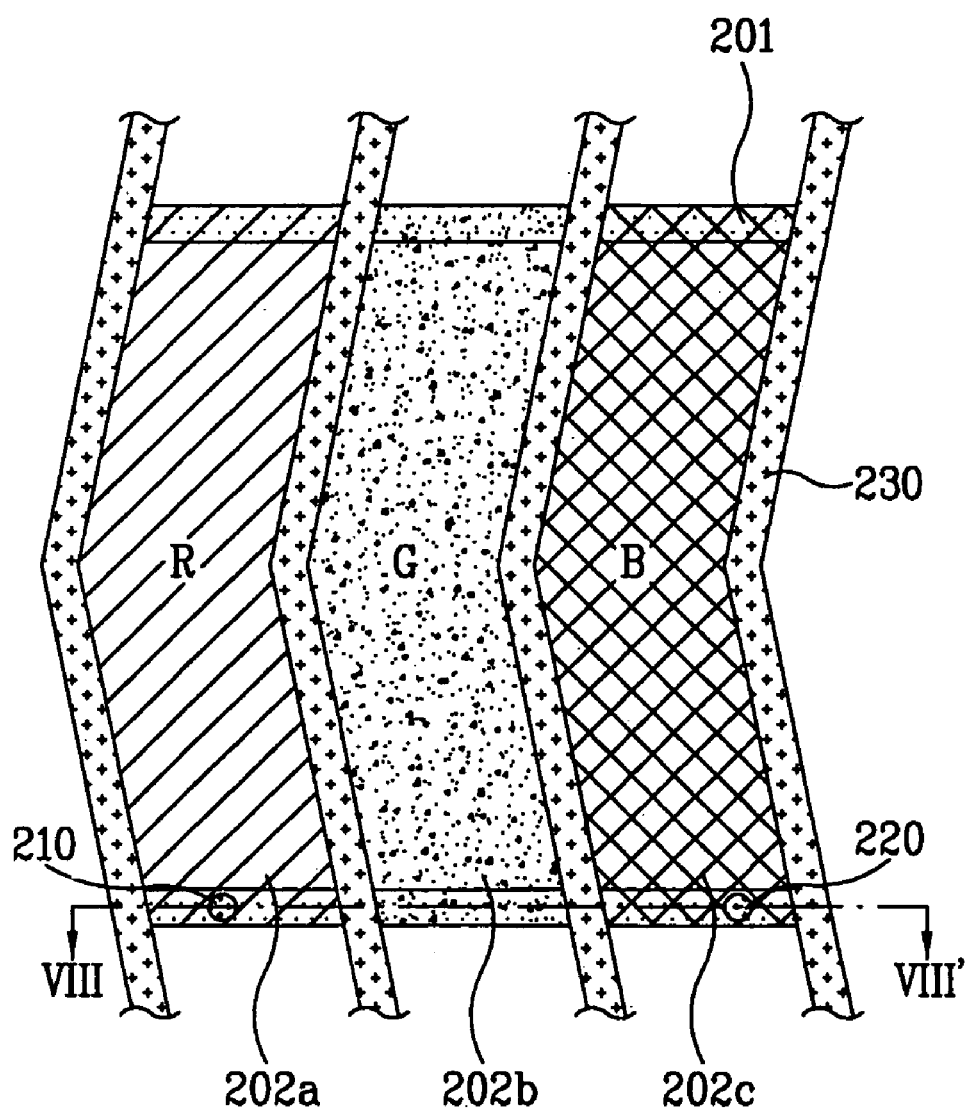
Figure 10:
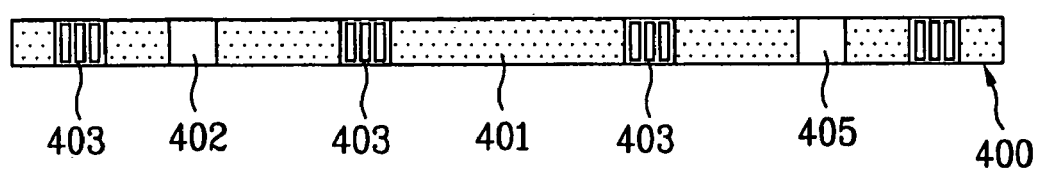
FIG. 10 is a sectional view schematically illustrating a mask used upon forming column spacers in the LCD device according to the first exemplary embodiment of the present invention.
Figure 11:
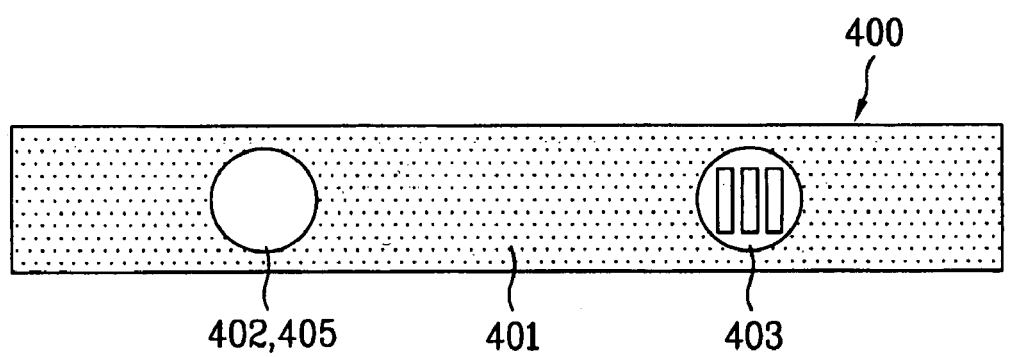
FIG. 11 is a plan view illustrating the mask of FIG. 10.

Hereinafter, the processes conducted on the second substrate in the above-described LCD device according to the first exemplary embodiment of the present invention will be described with reference to the annexed drawings. FIGS. 9A to 9C are plan views illustrating formation processes conducted on the second substrate in the LCD device according to the first exemplary embodiment of the present invention. FIG. 10 is a sectional view schematically illustrating a mask used upon forming column spacers in the LCD device according to the first exemplary embodiment of the present invention. FIG. 11 is a plan view illustrating the mask of FIG. 10. FIGS. 12A to 12G are cross-sectional views taken along the line VIII-VIII' of FIG. 9C, illustrating the formation processes conducted on the second substrate in the LCD device according to the first exemplary embodiment of the present invention.

Figure 12A:
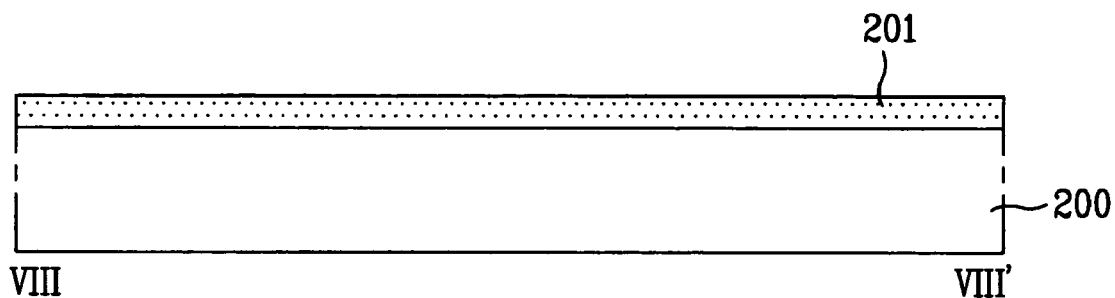
FIGS. 12A to 12G are cross-sectional views taken along line VIII-VIII' of FIG. 9C, illustrating formation processes conducted on the second substrate in the LCD device according to the first exemplary embodiment of the present invention.
Figure 12B:
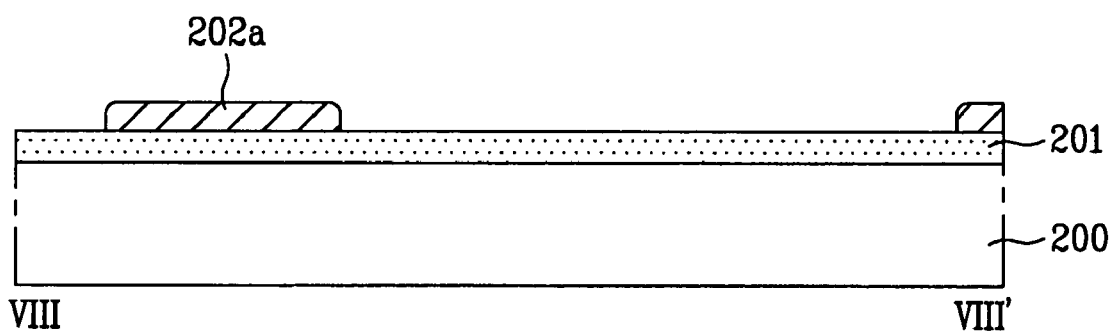
Figure 12C:
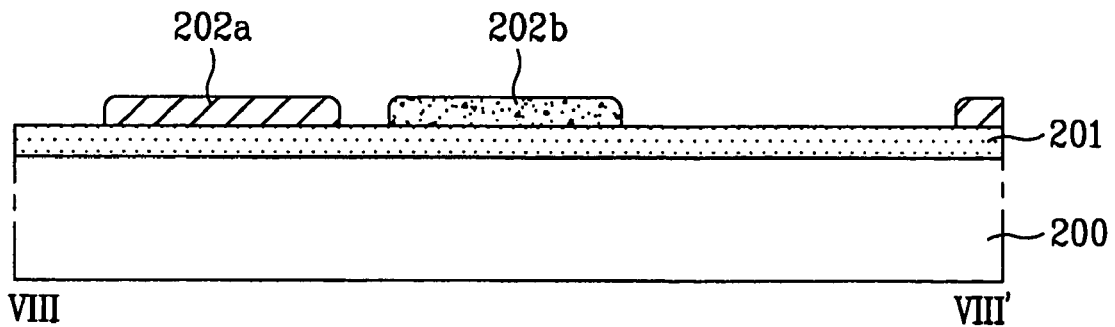
Figure 12D:
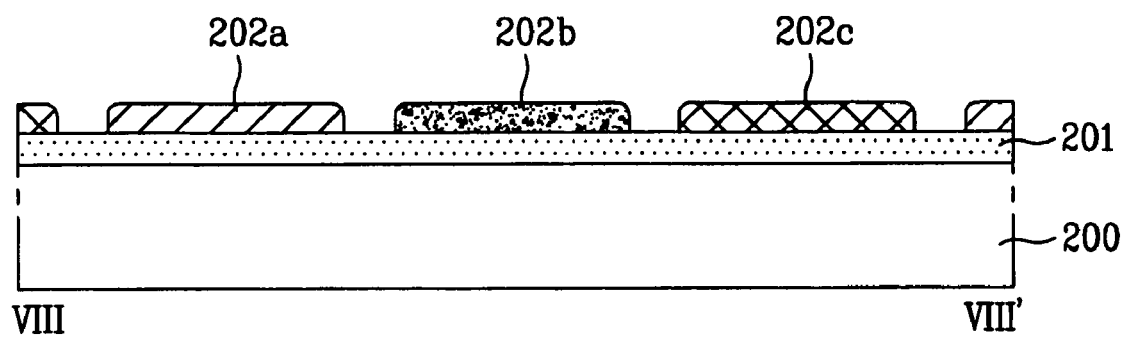

As shown in FIG. 9A and 12A, the black matrix layer 201 is first formed on the second substrate 200. The black matrix layer 201 is formed to have a shape shielding the gate lines 151 and data lines 155a formed on the first substrate 100, as shown in FIG. 9A. If necessary, the black matrix layer 201 may further extend to shield the TFTs.

Thereafter, as shown in FIG. 9B and FIGS. 12B to 12D, for each pixel, a color filter layer, which includes the first color filter layer 202a, second color filter layer 202b, and third color filter layer 202c, is formed on the second substrate 200 such that the first to third color filter layers 202a, 202b, and 202c are spaced apart from one another. The first to third color filter layers 202a, 202b, and 202c are formed to extend parallel to the associated data line while corresponding to the pixel regions of each pixel. The first to third color filter layers 202a, 202b, and 202c are also overlap laterally-extending portions of the black matrix layer 201. If necessary, the first to third color filter layers 202a, 202b, and 202c may be formed only in the associated pixel regions in the form of islands.

Figure 12E:
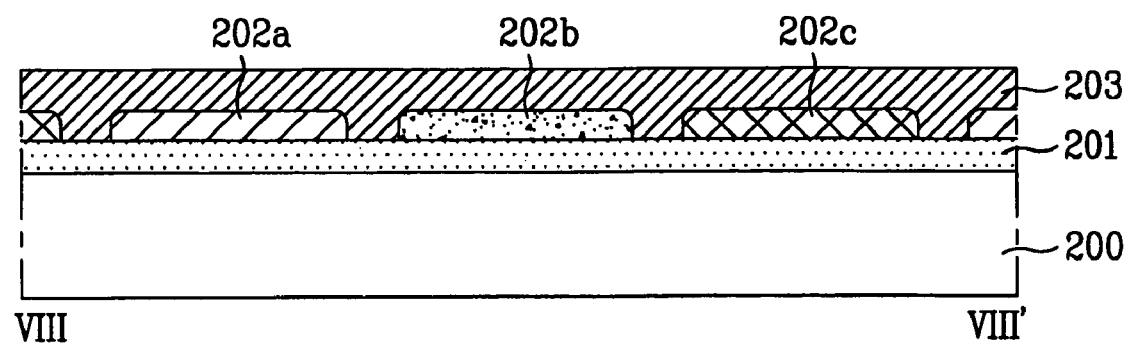

As shown in FIG. 12E, the overcoat layer 203 is then formed over the resultant surface of the second substrate 200 including the first to third color filter layers 202a, 202b, and 202c. Subsequently, a photosensitive organic film 205 containing photo-acryl is coated over the overcoat layer 203, as shown in FIG. 12F.

Thereafter, as shown in FIGS. 10 and 11, a mask 400 is prepared. The mask 400 includes a first transmissive region 402 defined to correspond to a region where each first column spacer is to be formed, a second transmissive region 405 defined to correspond to a region where each second column spacer is to be formed, a transflective region 403 defined to correspond to a region where each spacer pattern is to be formed, and a shielding region 401 defined by the remaining region of the mask 400. The prepared mask 400 is arranged over the resultant surface of the second substrate 200 including the photosensitive organic film 205.

In the illustrated case, the mask 400 is a slitted mask because silts are formed in the transflective region 403. In accordance with this structure, the mask 400 completely transmits light irradiated to the first and second transmissive regions 402 and 405, partially transmits light irradiated to the transflective region 403, and shields light irradiated to the shielding region 401. The mask 400 can adjust the amount of transmissive light by adjusting the pitch and width of the slits formed in the transflective region 403. In the illustrated case, the mask 400 corresponds to the case in which the photosensitive organic film 205 has a negative sensitivity. Where the photosensitive organic film 205 has a positive sensitivity, similar effects as described above can be obtained using a mask having a mask image reverse to that of the mask 400. In place of the above-described slitted mask, a half-tone mask coated with a half-tone material capable of emitting light incident to the transflective region 403 in an amount corresponding to 10 to 90% of the incidence light amount may be used, to obtain similar effects as described above.

Figure 12F:
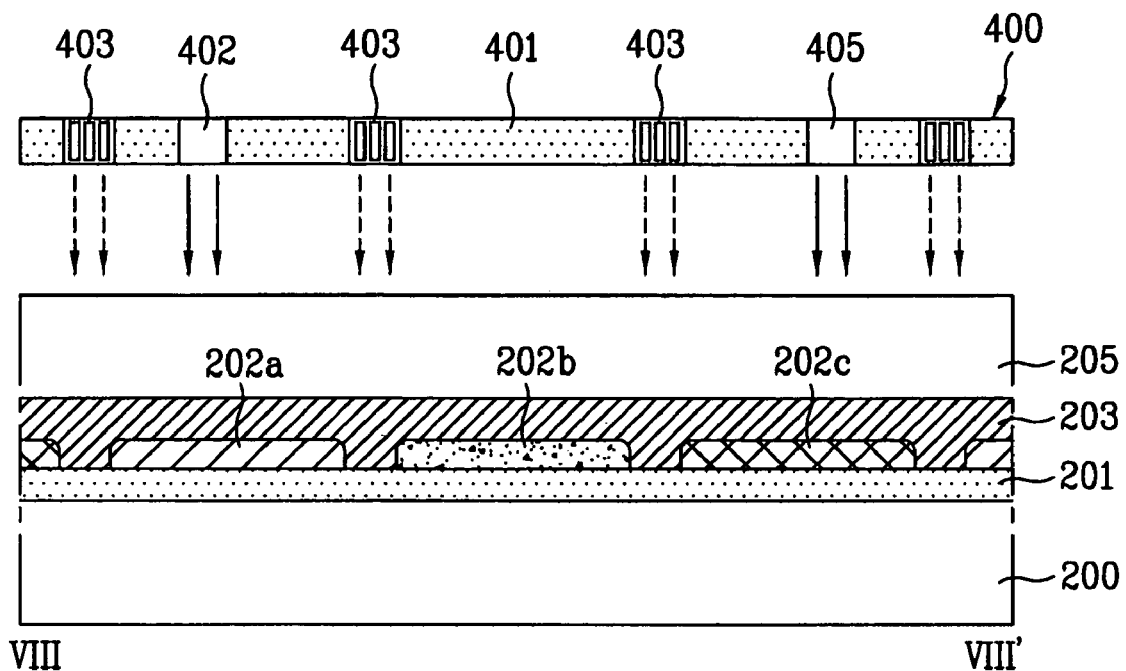
Figure 12G:
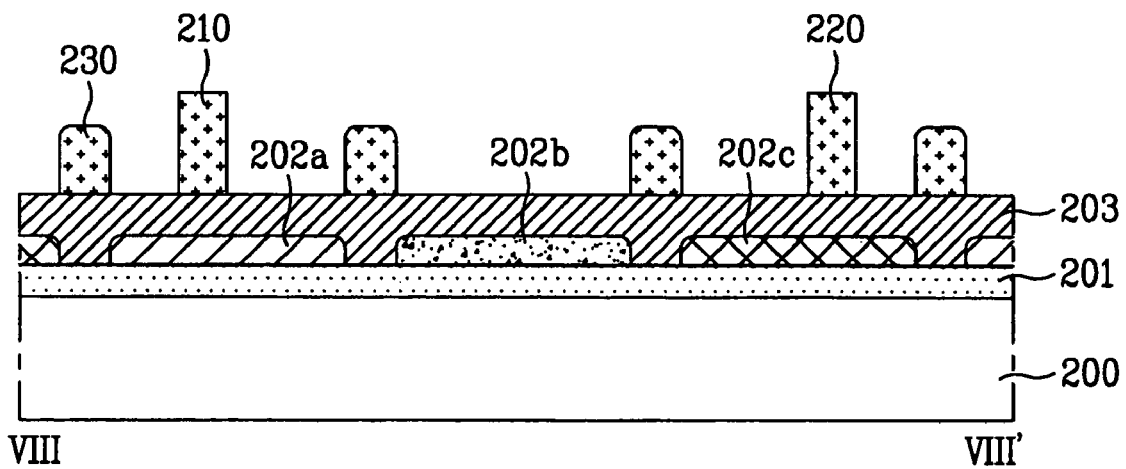

Thereafter, light exposure and development processes are carried out using the mask 400 shown in FIG. 12F, to pattern the photosensitive organic film 205. As a result, the first and second column spacers 210 and 220, which have the same height, and the spacer patterns 230, which have a height shorter than that of the first and second column spacers 210 and 220, are formed, as shown in FIG. 12G. If necessary, the portion of the mask 400 corresponding to each second column spacer 220, namely, the second transmissive region 405, may be defined as a second transflective region, which emits light in an amount ranging between the light amount through the first transmissive region 402 and the light amount through the transflective region 403, in order to form the second column spacer 220 to have a height shorter than the first column spacer 210, but longer than the spacer pattern 230.

Hereinafter, an example, in which the liquid crystal layer of the LCD device according to the first exemplary embodiment of the present invention is formed in accordance with a liquid crystal dispensing method, will now be described in conjunction with the above-described example.

Figure 13:
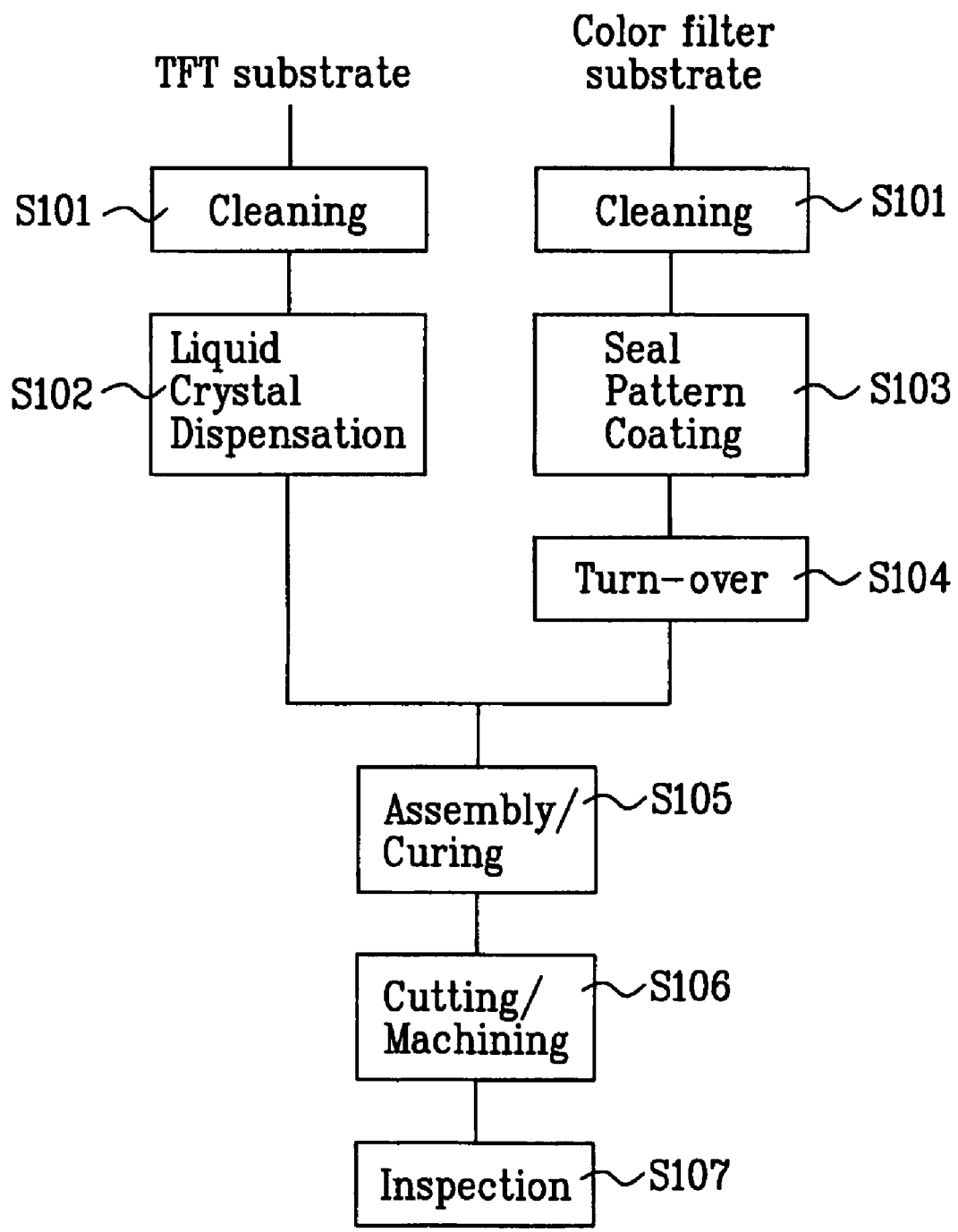
FIG. 13 is a flow chart illustrating a liquid crystal dispensing process applied to the present invention.

FIG. 13 is a flow chart illustrating a liquid crystal dispensing process applied to the present invention. As shown in FIG. 13, the first and second substrates 100 and 200, on which a TFT array and a color filter array including column spacers have been formed in the above-described manner, respectively, are prepared. Thereafter, orientation films are coated over the facing surfaces of the first and second substrates 100 and 200 respectively formed with the TFT array and column spacer array. The coated orientation films are then subjected to a rubbing process. Subsequently, the treated surfaces of the first and second substrates 100 and 100 are subjected to a cleaning process (S101). Liquid crystals are then dispensed onto a desired region on one of the first and second substrates 100 and 200. A seal pattern is formed at the periphery of each liquid crystal panel region of the other substrate, using a dispensing device (S103). Of course, both the dispensation of liquid crystals and the formation of the seal pattern may be conducted on one of the two substrates. The substrate, onto which no liquid crystal has been dispensed, is turned over (to face the other substrate) (S104). Thereafter, the facing TFT substrate and color filter substrate are pressed against each other, to be assembled, and the seal pattern is then cured (S105). Thereafter, the assembled substrate structure is cut into unit liquid crystal panels, and the unit liquid crystal panels are then machined (S106). For each machined unit liquid crystal panel, appearance and electrical defect inspections are conducted (S107). Thus, a desired LCD device is completely fabricated. When the LCD device according to the first exemplary embodiment of the present invention is applied to the liquid crystal dispensing process (S102), the amount of liquid crystals can be reduced by the volume of the spacer patterns 230.

Figure 14:
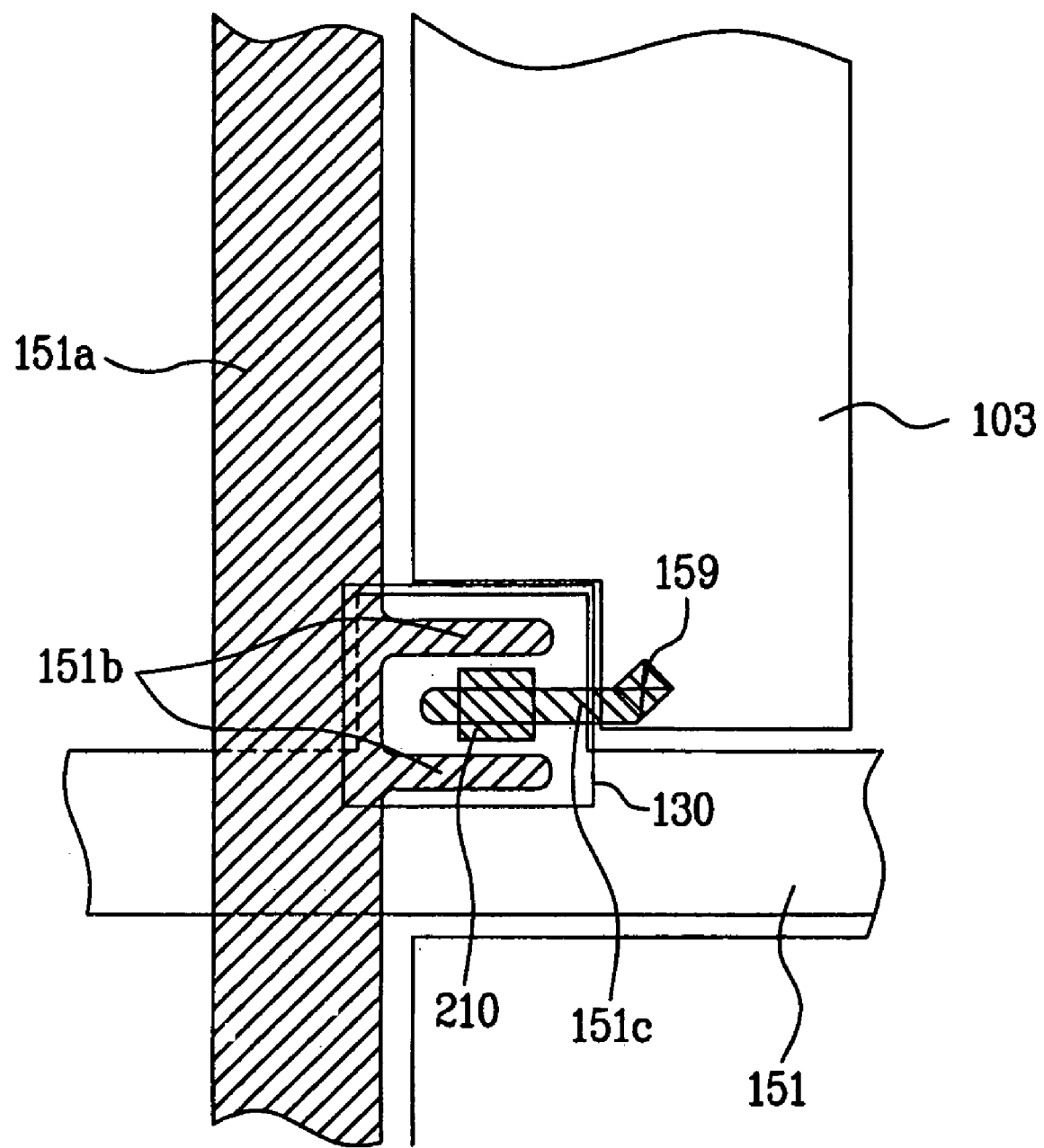
FIG. 14 is a plan view illustrating an LCD device according to a second exemplary embodiment of the present invention.

Hereinafter, an LCD device according to a second exemplary embodiment of the present invention will be described. FIG. 14 is a plan view illustrating the LCD device according to the second exemplary embodiment of the present invention. As shown in FIG. 14, the LCD device according to the second exemplary embodiment of the present invention is of a TN mode type. This LCD device has a similar configuration and effects as those of the structure shown in FIG. 6, except that a pixel electrode 103 is formed in the overall portion of each pixel region, and a common electrode (not shown) is additionally formed on the second substrate. For elements or regions respectively identical to those of FIG. 6, no description thereof will be given. In this embodiment, each first column spacer 210 is formed to correspond to the channel region of the associated TFT (the region defined between the source electrode 155b and the drain electrode 155c). Whether each first column spacer 210 is formed to correspond to a separate protrusion 120, as in the first exemplary embodiment, or is formed to correspond to the region defined between the source and drain electrodes 155a and 155c of the associated TFT, as shown in FIG. 14, is selective. The reason why the structure of FIG. 14 for the first column spacer 210 is selected in this embodiment is irrespective of the mode difference from the first exemplary embodiment. Any structure may be used, as long as it is possible to induce a desired step between the first and second column spacers 210 and 220.

Figure 16A:
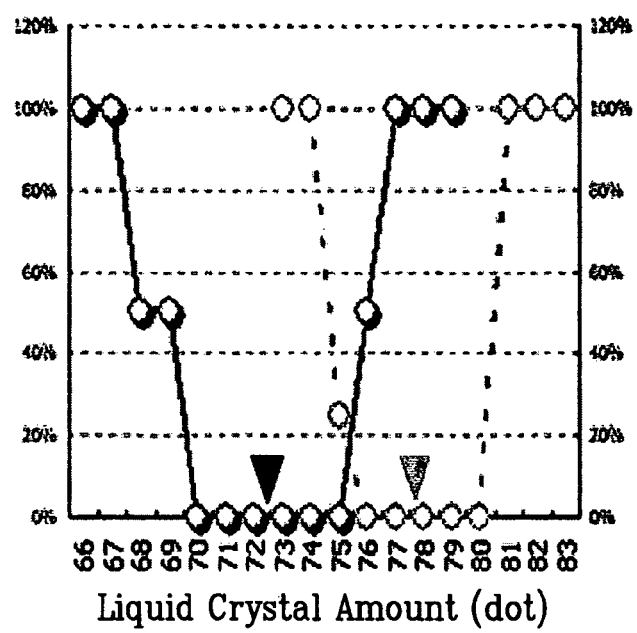
FIGS. 16A to 16D are graphs depicting liquid crystal margin characteristics exhibited in the examples of FIGS. 15A to 15D.
Figure 16B:
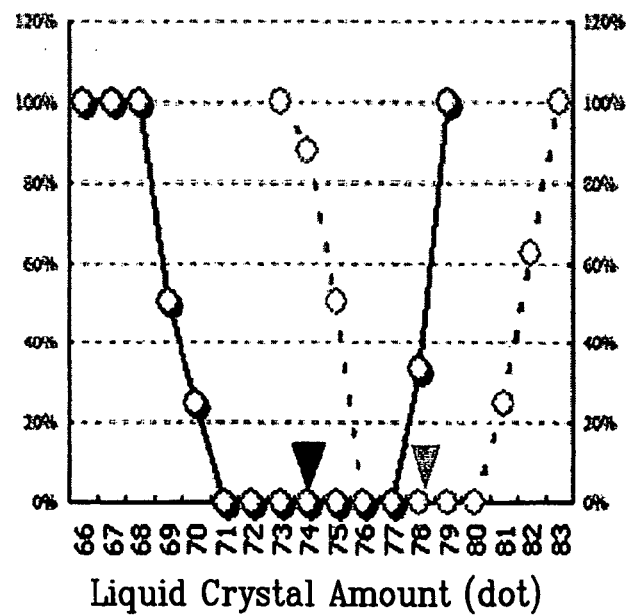
Figure 16C:
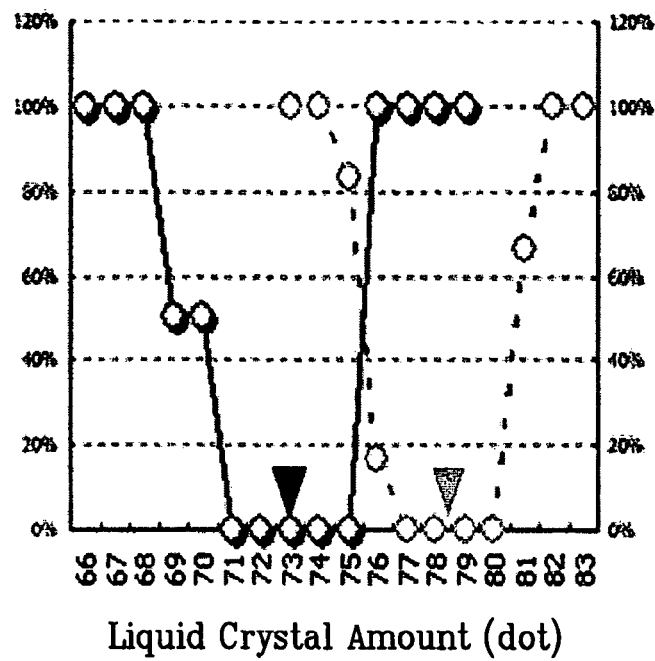
Figure 16D:
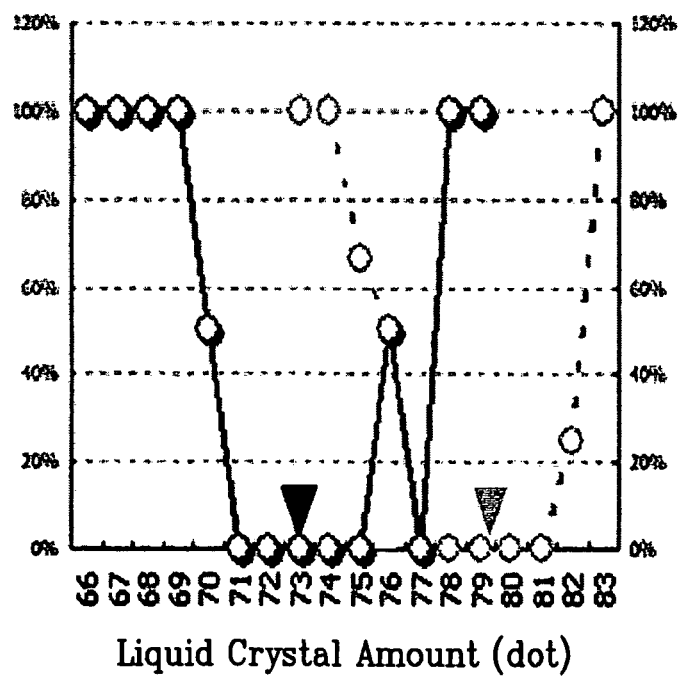
Figure 17:
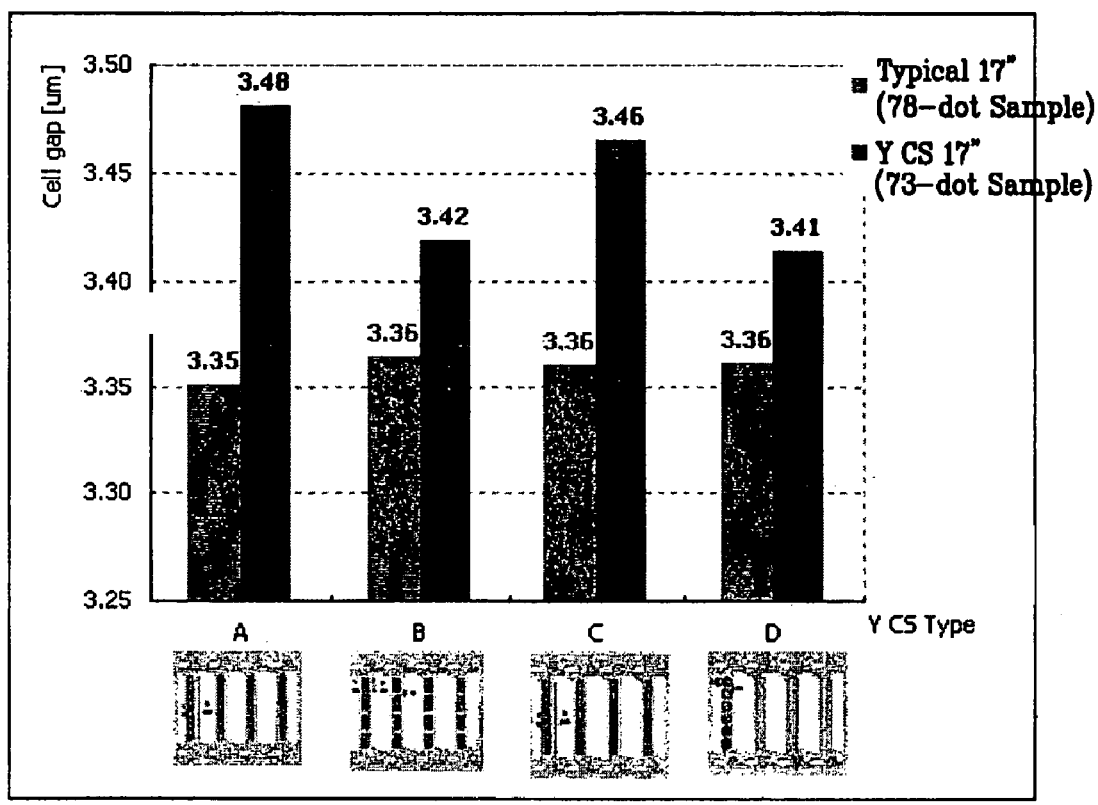
FIG. 17 is a graph depicting cell gap characteristics in the examples of FIGS. 15A to 15D.

Hereinafter, effects experimentally obtained in examples, to which the LCD device of the present invention is applied, will be described. FIGS. 15A to 15D are plan views illustrating examples, in which the spacer patterns of the LCD device according to the second exemplary embodiment of the present invention are modified into various types. FIGS. 16A to 16d are graphs depicting liquid crystal margin characteristics exhibited in the examples of FIGS. 15A to 15D. FIG. 17 is a graph depicting cell gap characteristics in the examples of FIGS. 15A to 15D.

Figure 15A:
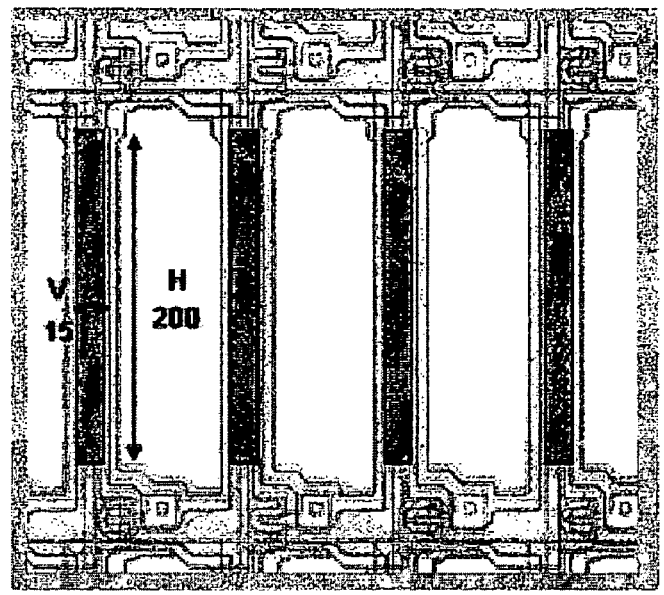
FIGS. 15A to 15D are plan views illustrating examples, in which the spacer patterns of the LCD device according to the second exemplary embodiment of the present invention are modified into various types.

FIG. 15A illustrates an example in which one spacer pattern is formed for each sub-pixel such that it corresponds to the associated data line and black matrix layer (formed to be overlapped with the data line), under the condition in which the spacer pattern has a width of 15 μm, and a length of 200 μm. When this structure is used, the point, where the liquid crystal margin capable of eliminating both gravity defects and touch defects is secured, is shifted in a liquid crystal amount reduction direction from a range of 75 to 80 dots, exhibited when the above-described spacer pattern is not used, to a range of 70 to 75 dots, as shown in FIG. 16A. Accordingly, the amount of liquid crystals can be reduced by 5 dots.

Figure 15B:
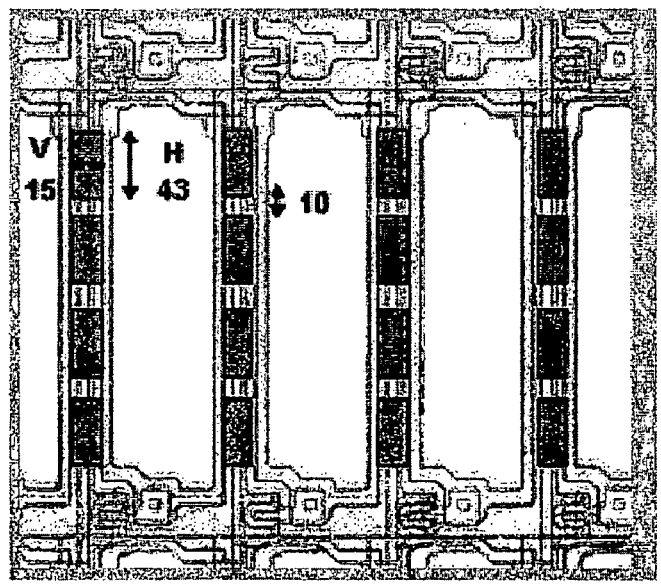

FIG. 15B illustrates an example in which four spacer patterns are formed for each sub-pixel while being longitudinally spaced apart from one another, under the condition in which each spacer pattern has a width of 15 μm, and a length of 43 μm. When this structure is used, the point, where the liquid crystal margin capable of eliminating both gravity defects and touch defects is secured, is shifted in a liquid crystal amount reduction direction from a range of 76 to 80 dots, exhibited when the above-described spacer pattern is not used, to a range of 71 to 77 dots, as shown in FIG. 16B. Accordingly, the amount of liquid crystals can be reduced by 5 to 6 dots.

Figure 15C:
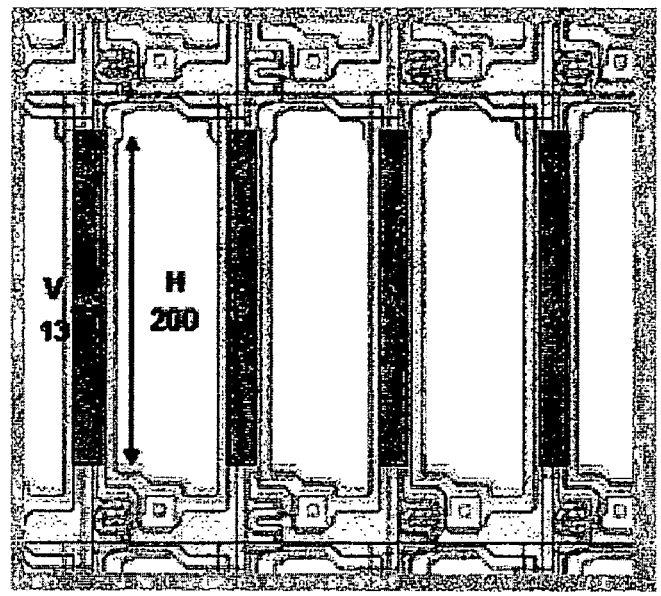

FIG. 15C illustrates an example in which one spacer pattern is formed for each sub-pixel, under the condition in which the spacer pattern has a width of 13 μm, and a length of 200 μm. When this structure is used, the point, where the liquid crystal margin capable of eliminating both gravity defects and touch defects is secured, is shifted in a liquid crystal amount reduction direction from a range of 77 to 80 dots, exhibited when the above-described spacer pattern is not used, to a range of 71 to 75 dots, as shown in FIG. 16C. Accordingly, the amount of liquid crystals can be reduced by 5 to 6 dots. The structure of FIG. 15C is an example in which the width of each spacer pattern is reduced from that of FIG. 15A by about 2 μm.

Figure 15D:
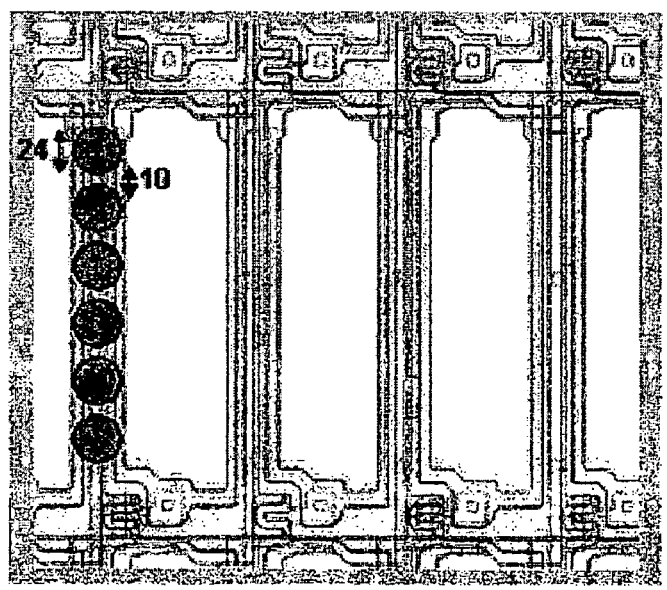

FIG. 15D illustrates an example in which six spacer patterns are formed for each sub-pixel while being longitudinally spaced apart from one another, under the condition in which each spacer pattern has a circular horizontal cross-section having a diameter of 24 μm. When this structure is used, the point, where the liquid crystal margin capable of eliminating both gravity defects and touch defects is secured, is shifted in a liquid crystal amount reduction direction from a range of 77 to 81 dots, exhibited when the above-described spacer pattern is not used, to a range of 71 to 77 dots, as shown in FIG. 16D. Accordingly, the amount of liquid crystals can be reduced by 4 to 6 dots.

FIGS. 15A to 15D are plan views showing the horizontal cross-sections of the associated spacer patterns, respectively. Each pattern, which has such a horizontal cross-section, is formed in the form of a circular pillar or a polygonal pillar in a space between the first and second substrates.

In each graph of FIGS. 16A to 16D, the broken line depicts an example, to which no spacer pattern is applied, and the solid line depicts an example, to which the spacer patterns are applied. The horizontal axis represents the degree of touch defects or gravity defects, whereas the vertical axis represents the amount of liquid crystals. In the experiment, 0.04 mg of liquid crystals was used per 1 dot. When the liquid crystal amount indicated at the left side of the graph increases, and the defect degree decreases in-each graph, it exhibits touch defects. On the other hand, when the liquid crystal amount indicated at the right side of the graph increases, and the defect degree increases, it exhibits gravity defects. The region satisfying the condition, in which both the degree of touch defects and the degree of gravity defects are 0 (zero), is referred to as a "liquid crystal margin region." As shown in the graphs, it can be seen that, when spacer patterns are used, there are characteristics securing the width of the liquid crystal margin region to be equal to or larger than that of the case using no spacer pattern. This means that the problems associated with touch defects or gravity defects are not generated due to the spacer patterns. Rather, this can be analyzed as partially reducing factors causing defects in accordance with a reduction in the liquid crystals sensitive to temperature. In accordance with the above-described characteristics, luminous characteristics can be improved even while the liquid crystal amount is reduced.

FIG. 17 depicts data as to cell gaps observed after dispensation of liquid crystals in the structures of FIGS. 15A to 15d. Referring to FIG. 17, it can be seen that, in accordance with the provision of the above-described spacer patterns, the cell gap in each example has a value of 3.48 μm, 3.42 μm, 3.46 μm, or 3.41 μm increased from a target cell gap value of 3.35 μm or 3.36 μm in each example. This means that, when the cell gap is reduced to the target cell gap value, namely, 3.35 μm or 3.36 μm, the amounts of liquid crystals in respective examples can be reduced to 1.86 dots, 0.46 dots, 1.40 dots, and 0.23 dots. That is, the amount of dispensed liquid crystals can be further reduced as compared to the amount of liquid crystals observed through FIGS. 16A to 16D. Although a reduction in liquid crystal amount by about 10% is observed in the above-described examples, an enhanced liquid crystal amount reduction effect can be expected in a model of a larger size or of an IPS mode, if the spacer patterns are provided to correspond to the black matrix layer. This is because the black matrix layer in such a model has an increased shield width.

Figure 18:
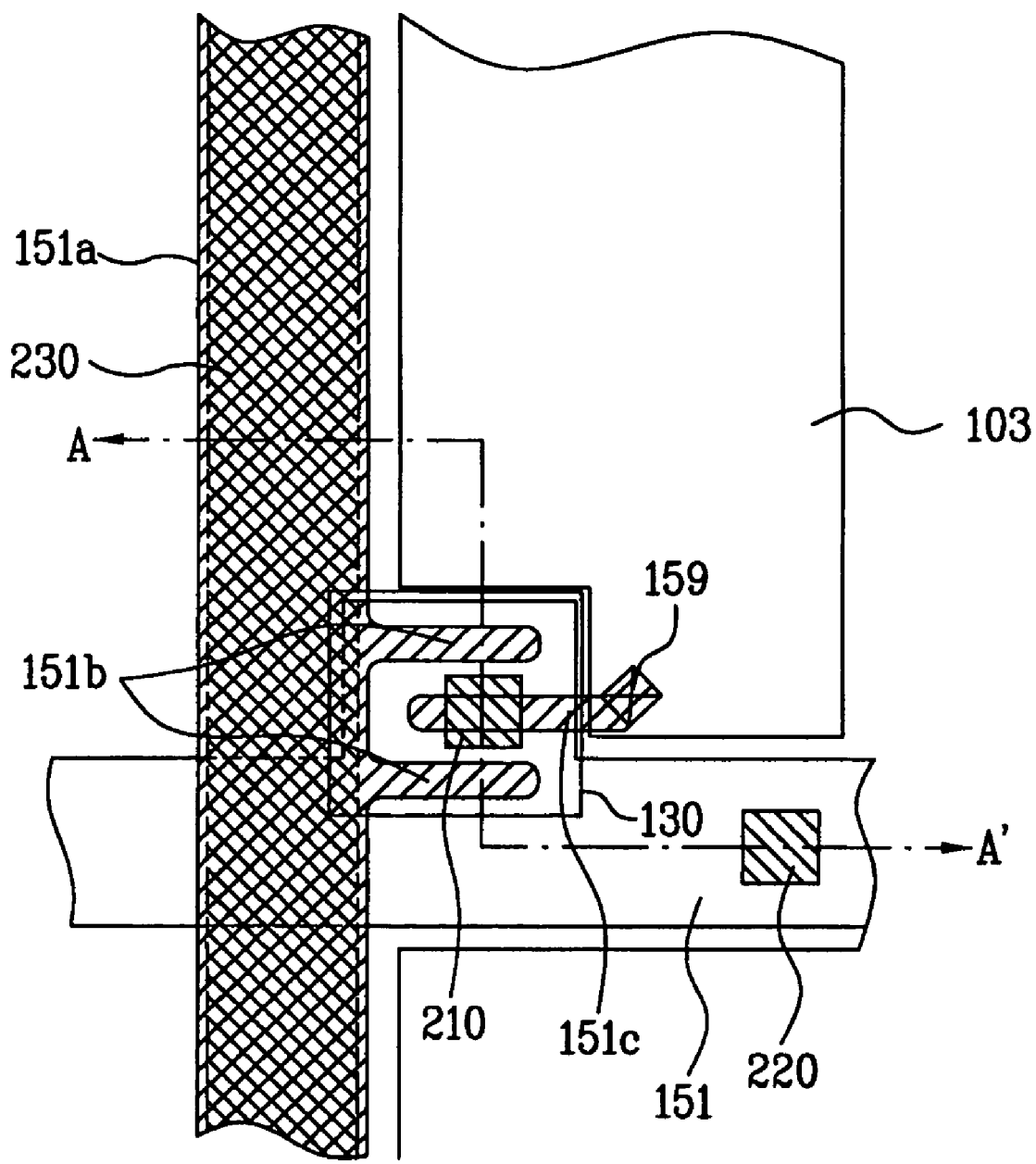
FIG. 18 is a plan view illustrating an LCD device according to a third exe,[;aru embodiment of the present invention.
Figure 19:
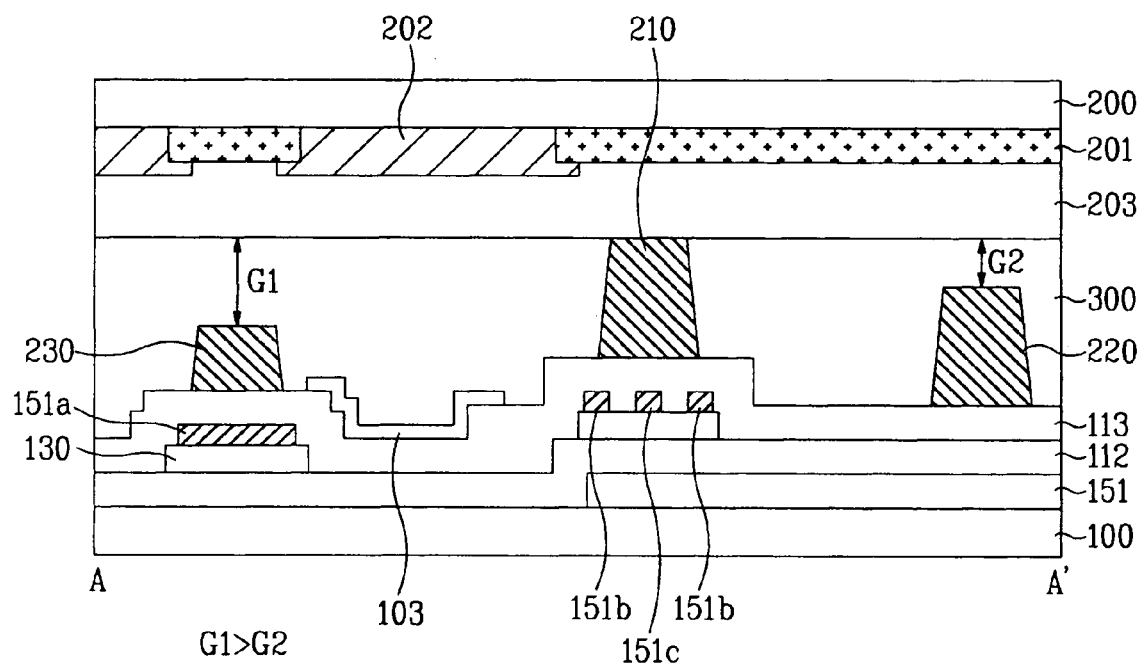
FIG. 19 is a cross-sectional view taken along line A-A' of FIG. 18.

FIG. 18 is a plan view illustrating an LCD device according to a third exemplary embodiment of the present invention. FIG. 19 is a cross-sectional view taken along the line A-A' of FIG. 18. As shown in FIGS. 18 and 19, the LCD device according to the third exemplary embodiment of the present invention has a similar configuration and effects as those of the structure shown in FIG. 4, except for the first and second column spacers 210 and 220 and the spacer patterns 230. For the same elements, no description thereof will be given.

Each first column spacer 210 is formed on the channel of the associated TFT formed on the first substrate 100. The first column spacer 210 has the same height and width as those of the above-described embodiments, and functions as a gap-maintaining spacer. Each second column spacer 220 is formed to overlap the associated gate line 151 formed on the first substrate 100. The second column spacer 220 has the same height as the first column spacer 210. Although the first and second column spacers 210 and 220 have the same height, a step between the first and second column spacers 210 and 220 can be induced because the first column spacer 210 is formed on the channel of the TFT. The second column spacer 220 has the same height and width as those of the above-described embodiments, and functions as a depression-preventing column spacer. Each spacer pattern 230 is formed on the first substrate 100 such that it overlaps with the associated data line 151a. The spacer pattern 230 has a height shorter than the first and second column spacers 210 and 220. Therefore, a first gap G1 between the spacer pattern 230 and the second substrate 200 is longer than a second gap G2 between the second column spacer 220 and the second substrate 200. The spacer pattern 230 achieves a depression preventing function and a reduction in liquid crystal amount.

Figure 20:
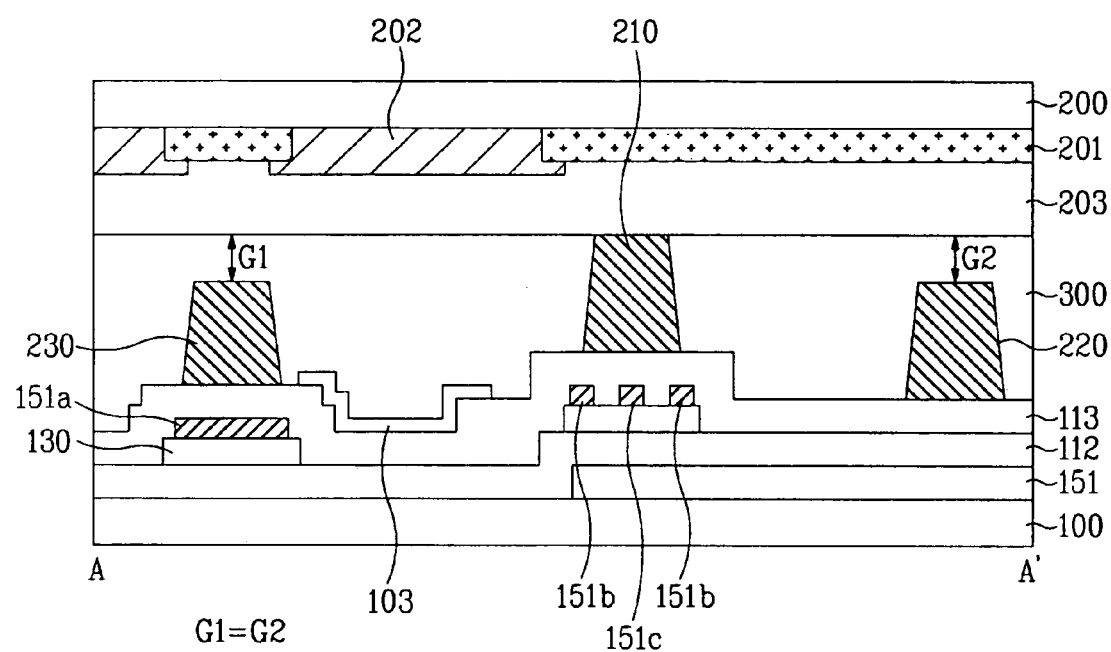
FIG. 20 is a sectional view illustrating a modified example of the LCD device according to the third exemplary embodiment of the present invention.

On the other hand, as shown in FIG. 20, the spacer pattern 230 may have the same height as the first and second column spacers 210 and 220. Therefore, a first gap G1 between the spacer pattern 230 and the second substrate 200 is equal to a second gap G2 between the second column spacer 220 and the second substrate 200. In this case, the second column spacers 220 may be dispensed with.

Hereinafter, a method for fabricating the LCD device according to the third exemplary embodiment of the present invention will be described. First, the gate lines 151 and data lines 151a are formed on the first substrate 100 such that they intersect each other to define pixel regions. The TFTs are then formed on the first substrate 100 at respective intersections of the gate lines 151 and data lines 151a. Thereafter, the first column spacers 210, second column spacers 220, and spacer patterns 230 are simultaneously formed, using a half-tone mask, a slitted mask, etc., such that each first column spacer 210 is arranged on the channel of the associated TFT formed on the first substrate 100, each second column spacer 220 overlaps the associated gate line 151, and each spacer pattern 230 overlaps with the associated data line 151a. Subsequently, a black matrix layer corresponding regions other than the pixel regions and color filter layers respectively corresponding to the pixel regions are sequentially formed on the second substrate. An overcoat layer is then formed over the resultant surface of the second substrate. Thereafter, liquid crystals are dispensed onto the first substrate or second substrate. The substrate, onto which no liquid crystal has been dispensed, is then turned over. Next, the two substrates are assembled.

Figure 21:
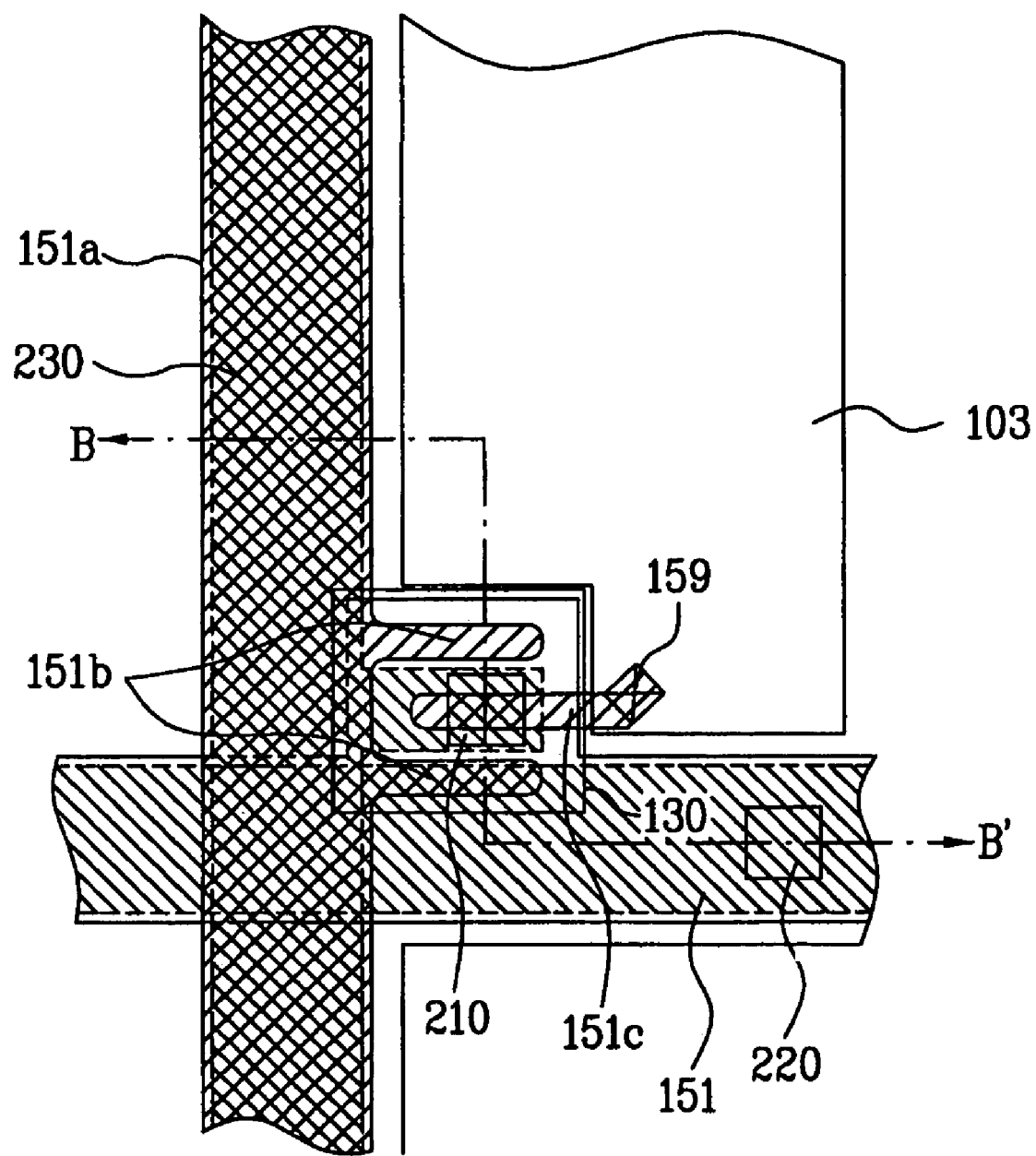
FIG. 21 is a plan view illustrating an LCD device according to a fourth exemplary embodiment of the present invention.
Figure 22:
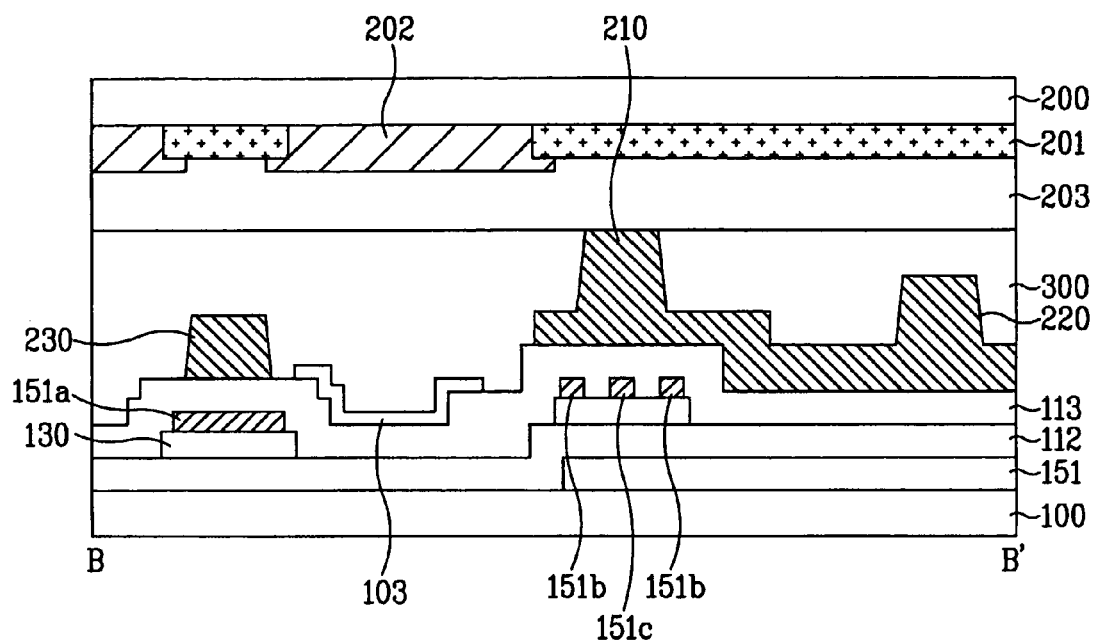
FIG. 22 is a cross-sectional view taken along line B-B' of FIG. 21.

FIG. 21 is a plan view illustrating an LCD device according to a fourth exemplary embodiment of the present invention. FIG. 22 is a cross-sectional view taken along line B-B' of FIG. 21. As shown in FIGS. 21 and 22, the LCD device according to the fourth exemplary embodiment of the present invention has a similar configuration and effects as those of the third embodiment, except that the first and second column spacers 210 and 220 and spacers patterns 230 are integrally formed. For the same elements, no description thereof will be given. The first and second column spacers 210 and 220 and spacer patterns 230 are integrally formed such that they are connected together so that they form a mesh structure. The first and second column spacers 210 and 220 and spacer patters 230, which form a mesh structure, are formed in a single process using a half-tone mask, a slitted mask, etc. Since the first and second column spacers 210 and 220 and spacer patterns 230 are integrally formed in accordance with the fourth embodiment of the present invention, the above-described depression-preventing function can be enhanced, and the amount of liquid crystals can be reduced.

Figure 23:
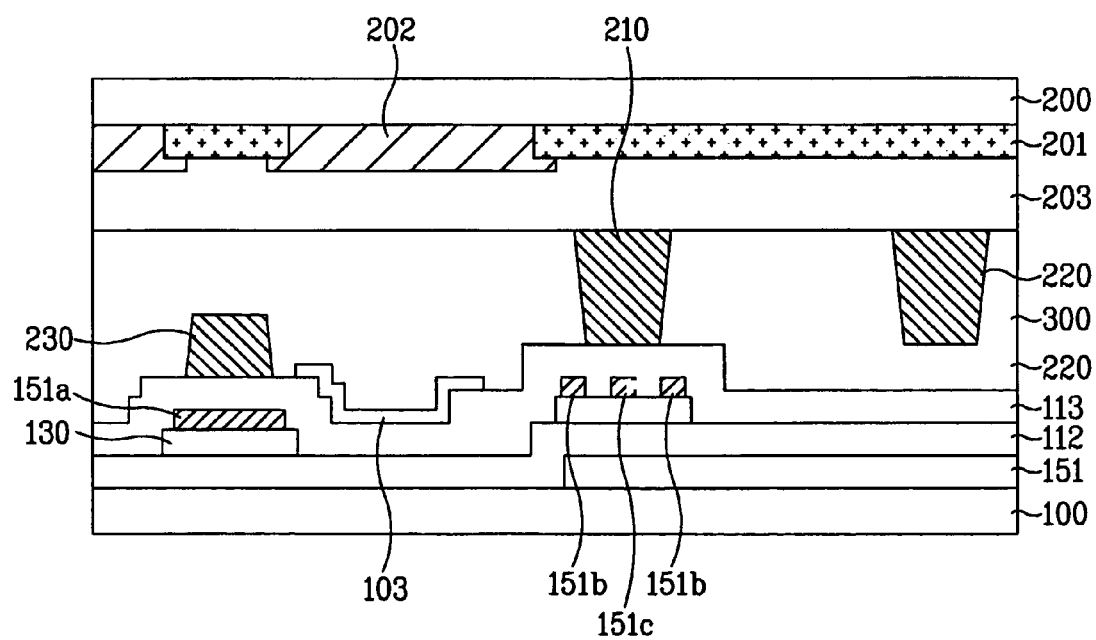
FIG. 23 is a sectional view for explaining first and second column spacers and spacer patterns in an LCD device according to a fifth exemplary embodiment of the present invention.

FIG. 23 is a sectional view for explaining first and second column spacers and spacer patterns in an LCD device according to a fifth exemplary embodiment of the present invention. In FIG. 23, the LCD device of the fifth embodiment is a combination of the first to third embodiments. That is, the first and second column spacers 210 and 220 are formed on the second substrate 200 such that they have the same height, as in the first and second embodiments. On the other hand, the spacer patterns 230 are formed on the first substrate 100 such that they have a height shorter than the first and second column spacers 210 and 220, as in the third embodiment. In this case, the second column spacers 220 may be dispensed with. The above-described LCD device according to the fifth exemplary embodiment of the present invention provides similar effects as those of the above-described embodiments.

Figure 24:
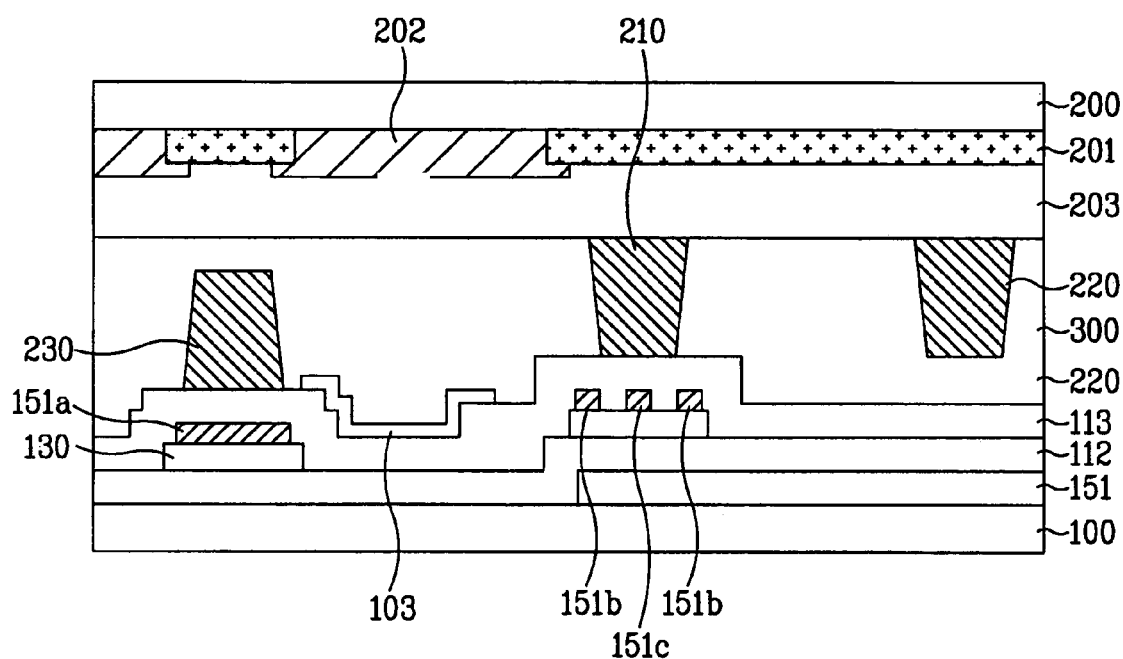
FIG. 24 is a sectional view for explaining first and second column spacers and spacer patterns in an LCD device according to a sixth exemplary embodiment of the present invention.
Figure 25:
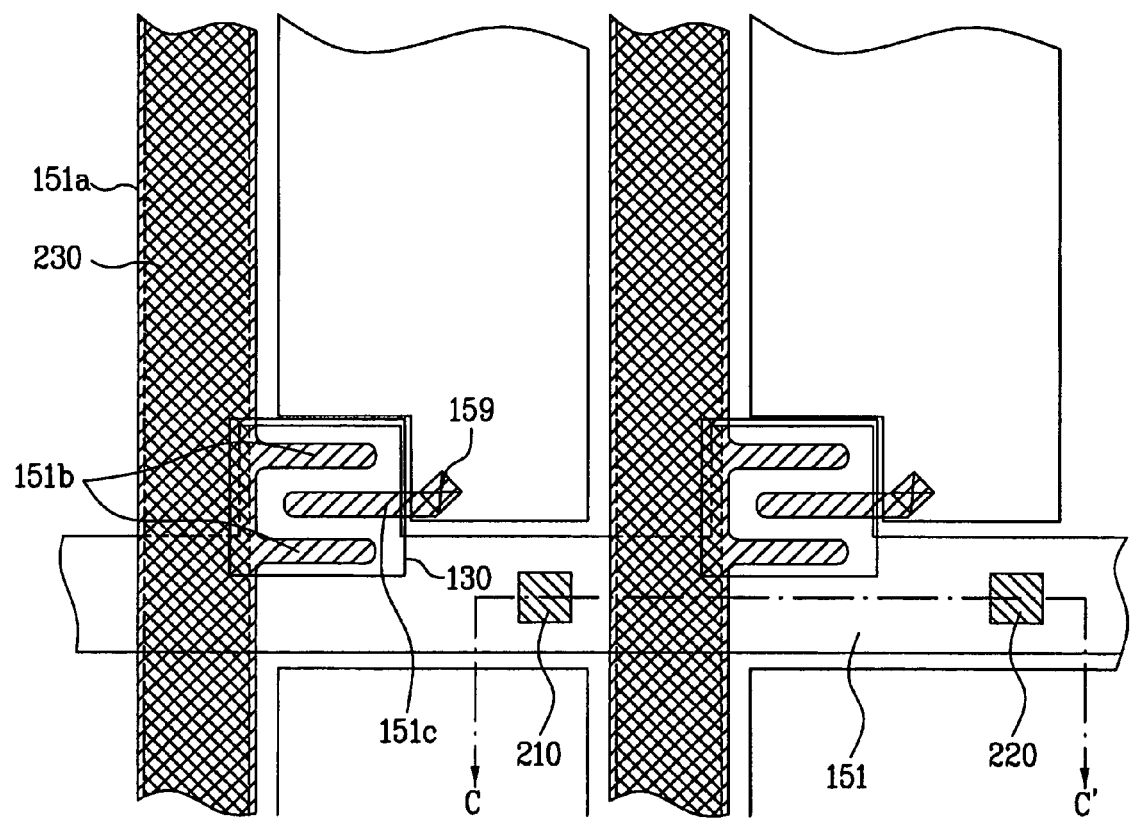
FIG. 25 is a plan view illustrating an LCD device according to a seventh exemplary embodiment of the present invention.
Figure 26:
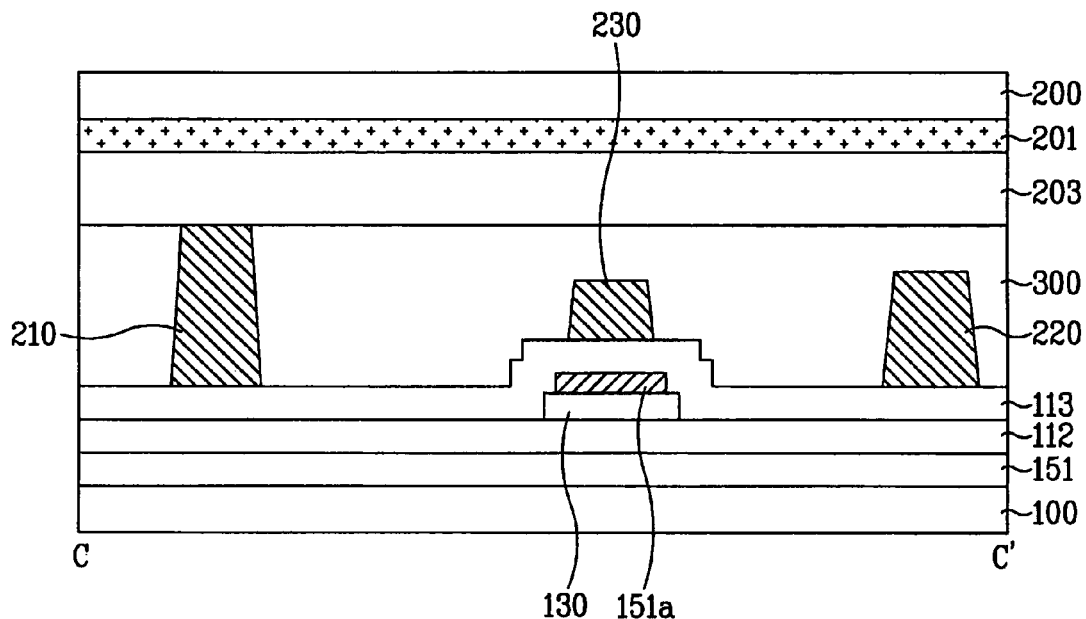
FIG. 26 is a cross-sectional view taken along line C-C' of FIG. 25.

FIG. 24 is a sectional view for explaining first and second column spacers and spacer patterns in an LCD device according to a sixth embodiment of the present invention. As shown in FIG. 24, the LCD device of the sixth embodiment has a similar configuration and effects as those of the fifth embodiment (FIG. 23), except that the first and second column spacers 210 and 220, and spacer patterns 230 have the same height. In this case, the second column spacers 220 may be dispensed with. FIG. 25 is a plan view illustrating an LCD device according to a seventh embodiment of the present invention. FIG. 26 is a cross-sectional view taken along line C-C' of FIG. 25.

As shown in FIGS. 25 and 26, the LCD device according to the seventh exemplary embodiment of the present invention has a similar configuration and effects as those of the structure shown in FIG. 4, except for the first and second column spacers 210 and 220 and the spacer patterns 230. For the same elements, no description thereof will be given. Each first column spacer 210 is formed overlapping the associated gate line 151 formed on the first substrate 100. The first column spacer 210 functions as a gap-maintaining spacer as described above. Each second column spacer 220 is formed to be spaced apart from the associated column spacer 210 while overlapping with the associated gate line formed on the first substrate 100. The second column spacer 220 has a height shorter than the associated first column spacer 210. The second column spacer 220 functions as a depression-preventing column spacer as described above. Each spacer pattern 230 is formed on the first substrate 100 such that it overlaps the associated data line 151a. The spacer pattern 230 has a height shorter than the second column spacer 220. The spacer pattern 230 achieves the above-described depression preventing function and reduces the liquid crystal amount. In this case, the second column spacers 220 may be dispensed with. The above-described LCD device according to the seventh exemplary embodiment of the present invention provides similar effects as those of the above-described embodiments.

Figure 27:
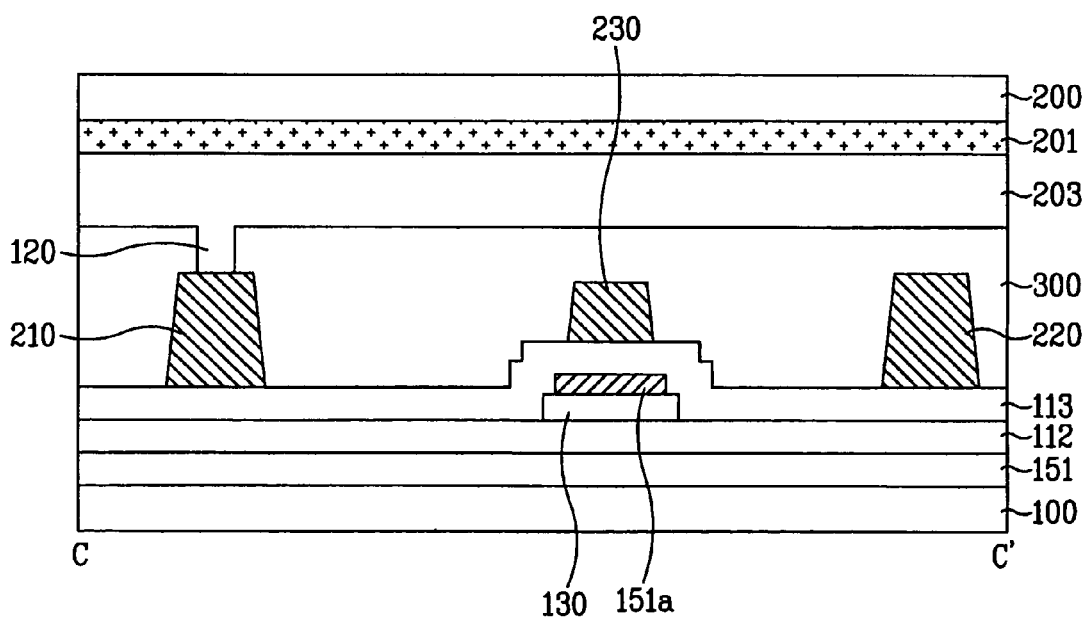
FIG. 27 is a sectional view for explaining first and second column spacers and spacer patterns in an LCD device according to an eighth exemplary embodiment of the present invention.

FIG. 27 is a sectional view for explaining first and second column spacers and spacer patterns in an LCD device according to an eighth exemplary embodiment of the present invention. As shown in FIG. 27, the LCD device according to the eight exemplary embodiment of the present invention has a similar configuration and effects as those of the seventh exemplary embodiment (FIG. 26), except for the first and second column spacers 210 and 220, the spacer patterns 230, and the protrusions 120 formed on the second substrate 200 to come into contact with the first column spacers 210. For the same elements, no description thereof will be given. The first column spacers 210 are formed to have the same height as the second column spacers 220. Each protrusion 120 is protruded from the overcoat layer 203 formed over the second substrate 200 toward the associated first column spacer 210. As the protrusion 120 comes into contact with the first column spacer 210, it functions as a gap-maintaining spacer as described above, together with the first column spacer 210. The second column spacers 220 and spacer patterns 230 have the same configurations as those of the seventh embodiment (FIG. 26). The second column spacers 220 may be dispensed with. The above-described LCD device according to the eighth exemplary embodiment of the present invention provides similar effects as those of the above-described embodiments.

Figure 28:
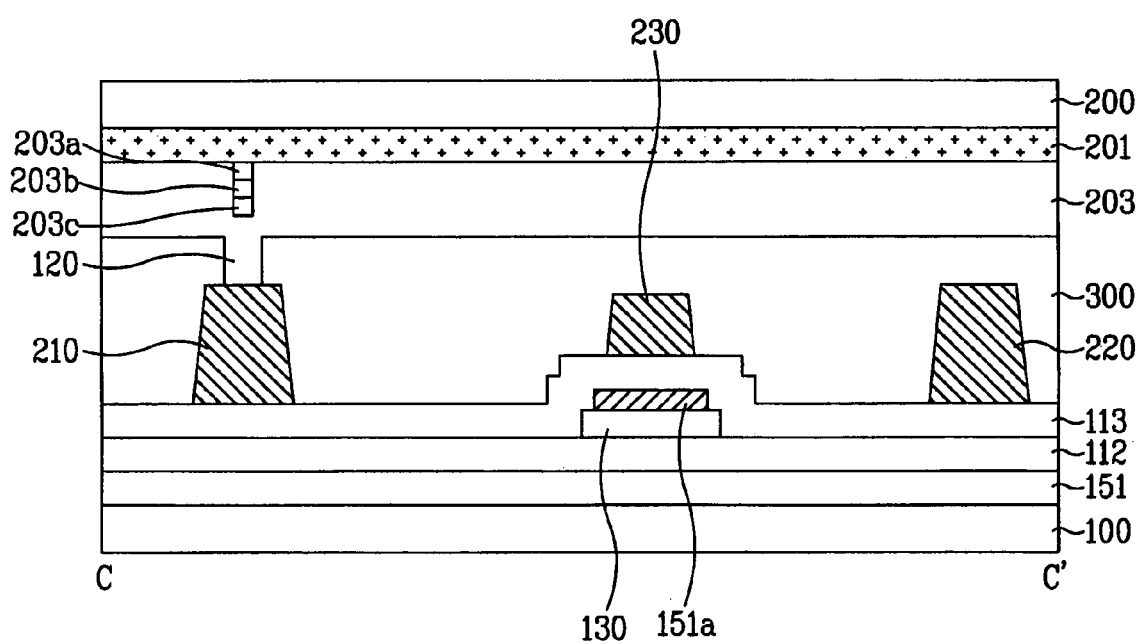
FIG. 28 is a sectional view for explaining first and second column spacers, spacer patterns, and protrusions in an LCD device according to a ninth exemplary embodiment of the present invention.

FIG. 28 is a sectional view for explaining first and second column spacers, spacer patterns, and protrusions in an LCD device according to a ninth exemplary embodiment of the present invention. As shown in FIG. 28, the LCD device according to the ninth exemplary embodiment of the present invention has a similar configuration and effects as those of the eighth exemplary embodiment, except for the protrusions 120. For elements other than the protrusions 120, no description thereof will be given. In detail, the protrusions 120 are formed from the overcoat layer 203 formed over the second substrate 200 to cover first to third dummy color filter layers 203a, 203b, and 203c, which are formed on the black matrix layer 201 formed on the second substrate 200. That is, the protrusions 120 are protruded to have a desired height by the first to third dummy color filter layers 203a, 203b, and 203c laminated over the black matrix layer 201 such that they overlap the first column spacers 210, upon forming the overcoat layer 203 so that the protrusions 120 come into contact with the first column spacers 210, respectively. In the laminated structure constituted by the first to third dummy color filter layers 203a, 203b, and 203c, one or two layers thereof may be dispensed with in accordance with the height of the protrusions 120. As each protrusion 120 comes into contact with the associated first column spacer 210, it functions as a gap-maintaining spacer as described above, together with the first column spacer 210. In the LCD device according to the ninth exemplary embodiment of the present invention, the overcoat layer 203 may be dispensed with. The above-described LCD device according to the ninth exemplary embodiment of the present invention provides similar effects as those of the above-described embodiments.

Figure 29:
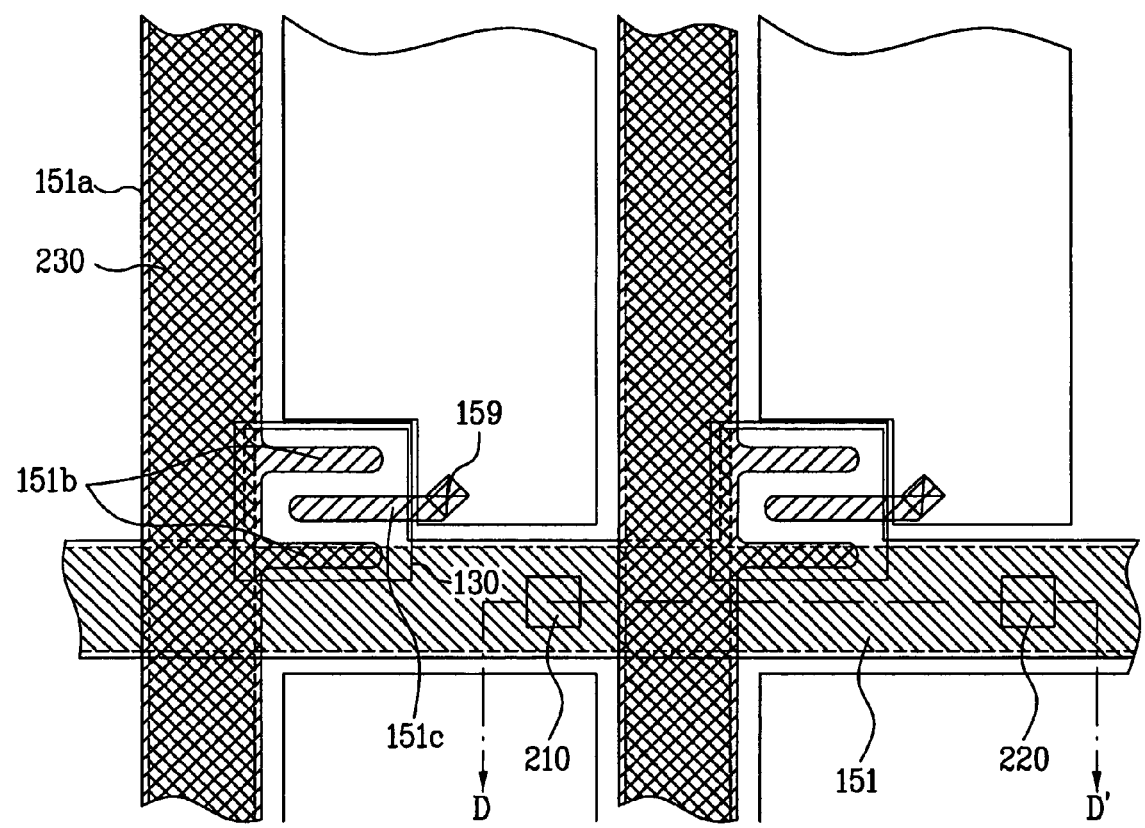
FIG. 29 is a plan view illustrating an LCD device according to a tenth embodiment of the present invention.
Figure 30:
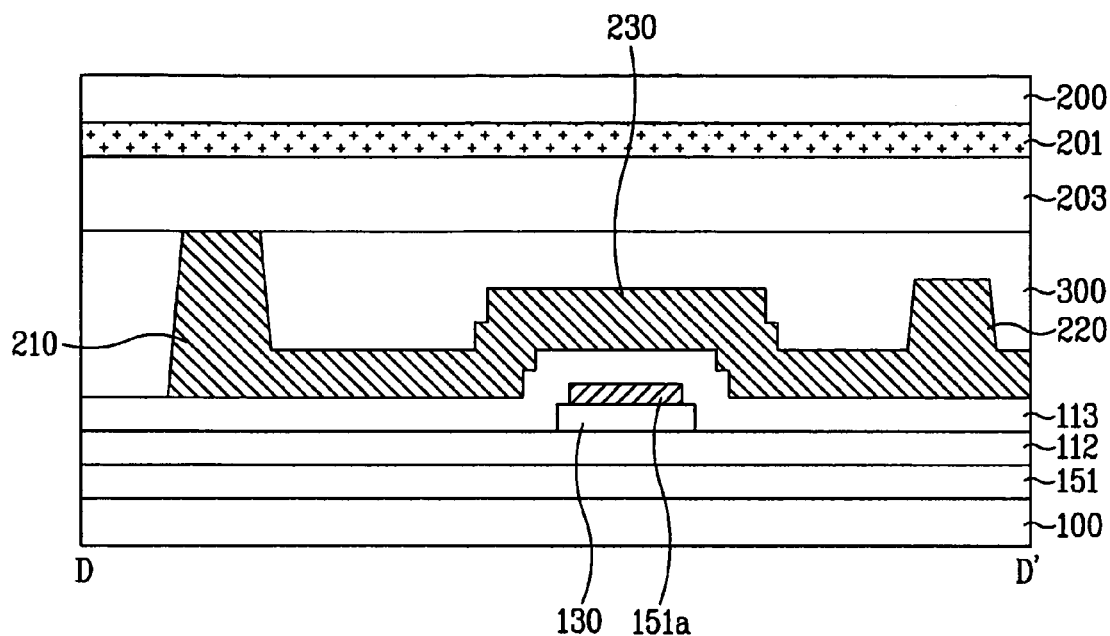
FIG. 30 is a cross-sectional view taken along line D-D' of FIG. 29.

FIG. 29 is a plan view illustrating an LCD device according to a tenth exemplary embodiment of the present invention. FIG. 30 is a cross-sectional view taken along line D-D' of FIG. 29. As shown in FIGS. 29 and 30, the LCD device according to the tenth embodiment of the present invention has a similar configuration and effects as those of the seventh embodiment (FIG. 26), except that the first and second column spacers 210 and 220 and spacer patterns 230 are integrally formed. For the same elements, no description thereof will be given. The first and second column spacers 210 and 220 are formed to overlap the gate lines 151, while being spaced apart from each other. Each spacer pattern 230 is formed to overlap with the associated data line 111a and gate line 151. Thus, the first and second column spacer 210 and 220, and spacer patterns 230 are integrally formed such that they are connected together so that they form a mesh structure. The first and second column spacers 210 and 220 and spacer patters 230, which form a mesh structure, are formed in a single process using a half-tone mask, a slitted mask, etc. Since the first and second column spacers 210 and 220 and spacer patterns 230 are integrally formed in accordance with the tenth exemplary embodiment of the present invention, the above-described depression-preventing function can be enhanced, the amount of liquid crystals can be reduced.

Figure 31:
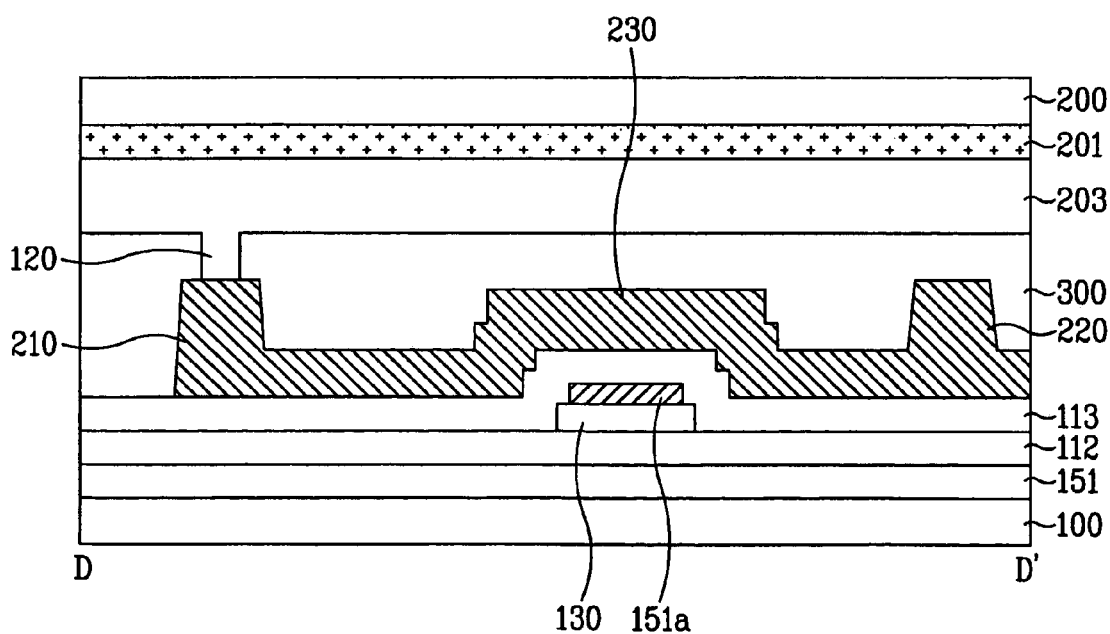
FIG. 31 is a sectional view for explaining first and second column spacers and spacer patterns in an LCD device according to an eleventh exemplary embodiment of the present invention.

FIG. 31 is a sectional view for explaining first and second column spacers and spacer patterns in an LCD device according to an eleventh exemplary embodiment of the present invention. Here, the LCD device of the eleventh exemplary embodiment is a combination of the eighth exemplary embodiment (FIG. 27) and the tenth exemplary embodiment (FIG. 30). In detail, the LCD device according to the eleventh exemplary embodiment includes first and second column spacers 210 and 220, and spacer patterns 230, which are formed on the first substrate 100 such that they are connected together to form a mesh structure, and protrusions 120 formed on the second substrate 200 such that the each protrusion 120 comes into contact with the associated first column spacer 210. The first and second column spacers 210 and 220 are formed on the first substrate, to have the same height, as in the eighth embodiment. On the other hand, each spacer pattern 230 is formed to have a height shorter than the first and second column spacers 210 and 220, while overlapping the associated data line 151a and gate line 151, as in the tenth exemplary embodiment. As a result, the first and second column spacers 210 and 220, and spacer patterns 230 are connected together. In this case, the second column spacers 220 may be dispensed with. Each protrusion 120 is protruded from the overcoat layer 203 formed over the second substrate 200 toward the associated first column spacer 210. As the protrusion 120 comes into contact with the first column spacer 210, it functions as a gap-maintaining spacer as described above, together with the first column spacer 210. The above-described LCD device according to the eleventh exemplary embodiment of the present invention provides similar effects as those of the above-described embodiments.

Figure 32:
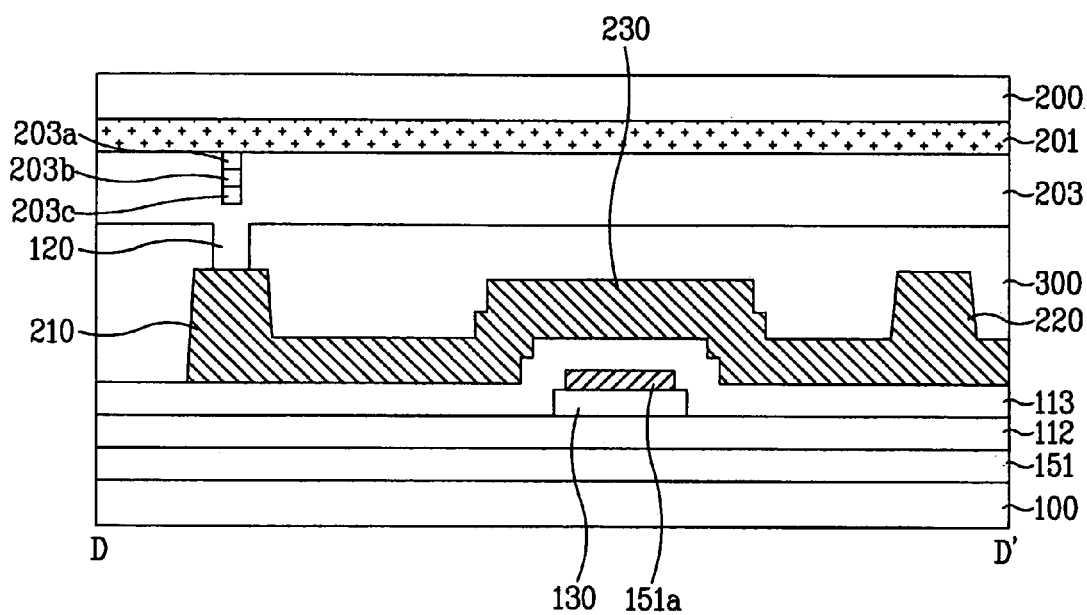
FIG. 32 is a sectional view for explaining first and second column spacers and spacer patterns in an LCD device according to a twelfth exemplary embodiment of the present invention.

FIG. 32 is a sectional view for explaining first and second column spacers and spacer patterns in an LCD device according to a twelfth exemplary embodiment of the present invention. Here, the LCD device of the twelfth exemplary embodiment is a combination of the ninth exemplary embodiment (FIG. 28) and the eleventh embodiment (FIG. 31). The LCD device according to the twelfth embodiment has the same configuration as that of the eleventh embodiment, except that first to third dummy color filter layers 203a, 203b, and 203c are formed on the black matrix layer 201 formed on the second substrate 200, to form the protrusions 120 contacting the first column spacers 210, as in the ninth embodiment. In the LCD device according to the twelfth exemplary embodiment of the present invention, the overcoat layer 203 may be dispensed with. The above-described LCD device according to the twelfth embodiment of the present invention provides similar effects as those of the above-described embodiments.

Although the third to twelfth embodiments have been described in conjunction with TN mode LCD devices, they may also be equivalently applied to the IPS mode LCD device according to the first exemplary embodiment of the present invention. As apparent from the above description, the LCD device according to the present invention and the fabrication method thereof have the following effects. First, since the spacer patterns made of the same material as the column spacers are formed in the space in which liquid crystals are filled, the amount of liquid crystal material filled between the facing substrates can be reduced. Accordingly, the process time taken to dispense liquid crystals can be reduced, and the expense in accordance with the liquid crystal amount can be reduced. Second, since the spacer patterns may function as separate depression-preventing column spacers, an increase in panel strength is achieved, and thus, an enhancement in the display quality of the LCD device is achieved. Third, since depression-preventing column spacers, which have a height shorter than the gap-maintaining column spacers, are formed to reduce the contact area of the gap-maintaining column spacers contacting the substrate facing the gap-maintaining column spacers and to share an external pressure applied to the substrates with the gap-maintaining column spacers, generation of a display stain caused by the gap-maintaining column spacers can be prevented, whereby improving luminous characteristics.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
first and second substrates facing each other;
gate lines and data lines formed on the first substrate such that the gate lines and the data lines intersect each other to define pixel regions;
thin film transistors formed at respective intersections of the gate lines and the data lines;
a black matrix layer formed on the second substrate such that the black matrix layer is disposed corresponding to a region other than the pixel region;
color filter layers formed on the second substrate such that the color filter layers are disposed corresponding to the pixel regions, respectively;
a liquid crystal layer interposed between the first and second substrates;
first column spacers formed on one of the first and second substrates to maintain a cell gap between the first and second substrate wherein each first column spacers has a first height such that the first column spacer is disposed corresponding to one of the gate lines, the data lines and the thin film transistors;
wherein each second column spacer has a second height to form a first gap between the second column spacer and the second substrate or the first substrate, respectively, such that the second column spacers are disposed corresponding to the gate line; and
third column spacers formed on one of the first substrate and the second substrate wherein each third column spacer has a third height to form a second gap between the third column spacer and the second substrate or the first substrate, respectively, such that the third column spacers are disposed corresponding to the data line,
wherein each of the first column spacers has a first area contacting with one of the first substrate and the second substrate, each of the second column spacers has a second area contacting with one of the first substrate and the second substrate, and each of the third column spacers has a third area contacting with one of the first substrate and the second substrate,
wherein a sum of the third areas of the third column spacers is larger than a sum of the first areas of the first column spacers and a sum of the second areas of the second column spacers.

2. The liquid crystal display device according to claim 1, wherein the first gap is equal to or larger than the second gap.

3. The liquid crystal display device according to claim 1, wherein the first column spacers, the second column spacers, and the third column spacers are simultaneously formed on the first substrate or on the second substrate.

4. The liquid crystal display device according to claim 1, wherein the third column spacers are connected with the first and second column spacers to form a mesh structure.

5. The liquid crystal display device according to claim 1, wherein the first and second column spacers are formed on the same substrate, and the third column spacers are formed on the substrate other than the substrate formed with the first and second column spacers.

6. The liquid crystal display device according to claim 1, wherein the first column spacers are in direct contact with the substrate facing the first column spacer.

7. The liquid crystal display device according to claim 1, further comprising:
protrusions formed corresponding to the first column spacers wherein each protrusion is formed on a substrate opposite to a substrate on which the first substrate column spacer is formed.

8. The liquid crystal display device according to claim 7, wherein the protrusions are formed on the same layer as the data lines.

9. The liquid crystal display device according to claim 7, wherein the protrusions are protruded from an overcoat layer formed to cover the second substrate including the black matrix layer and the color filter layers.

10. The liquid crystal display device according to claim 9, further comprising dummy color filter layers formed between the black matrix layer and the overcoat layer such that the dummy color filter layers overlap the protrusions, the dummy color filter layers being made of the same material as the color filter layers.

11. A method for fabricating a liquid crystal display device, comprising:
forming gate lines and data lines on a first substrate such that the gate lines and the data lines intersect each other, to define pixel regions, and forming thin film transistors at respective intersections of the gate lines and the data lines;
forming a black matrix layer on the second substrate such that the black matrix layer corresponds to a region other than the pixel regions;
forming color filter layers on a second substrate such that the color filter layers correspond to respective pixel regions;
forming first column spacers on one of the first and second substrates to maintain a cell gap between the first and second substrate wherein each first column spacers has a first height such that the first column spacer is disposed corresponding to one of the gate lines, the data lines and the thin film transistors;
forming second column spacers on one of the first substrate and the second substrate wherein each second column spacer has a second height to form a first gap between the second column spacer and the second substrate or the first substrate, respectively, such that the second column spacers are disposed corresponding to the gate line;
forming third column spacers on one of the first substrate and the second substrate wherein each third column spacer has a third height to form a second gap between the third column spacer and the second substrate or the first substrate, respectively, such that the third column spacers are disposed corresponding to the data line; and
bonding the first and second substrates such that a liquid crystal layer is formed between the first and second substrates,
wherein each of the first column spacers has a first area contacting with one of the first substrate and the second substrate, each of the second column spacers has a second area contacting with one of the first substrate and the second substrate, and each of the third column spacers has a third area contacting with one of the first substrate and the second substrate,
wherein a sum of the third areas of the third column spacers is larger than a sum of the first areas of the first column spacers and a sum of the second areas of the second column spacers.

12. The method according to claim 11, wherein the first gap is equal to or larger than the second gap.

13. The method according to claim 11, wherein the first column spacers, the second column spacers, and the third column spacers are simultaneously formed on the first substrate or on the second substrate.

14. The method according to claim 13, wherein the third column spacers are connected with the first and second column spacers to form a mesh structure.

15. The method according to claim 11, wherein the first and second column spacers are formed on the same substrate, and the third column spacers are formed on the substrate other than the substrate formed with the first and second column spacers.

16. The method according to claim 11, wherein the first column spacer directly contacts with the substrate facing the first column spacer.

17. The method according to claim 11, further comprising:
forming protrusions corresponding to the first column spacers wherein each protrusion is formed on a substrate opposite to a substrate on which the first substrate column spacer is formed.

18. The method according to claim 17, wherein the protrusions are formed on the same layer as the data lines.

19. The method according to claim 17, wherein the protrusions are protruded from an overcoat layer formed to cover the second substrate including the black matrix layer and the color filter layers.

20. The method according to claim 19, wherein the step of forming the protrusions comprises forming dummy color filter layers between the black matrix layer and the overcoat layer such that the overcoat layer is protruded to form the protrusions.

21. The liquid crystal display device according to claim 7, further comprising a passivation layer formed on the protrusions wherein the passivation layer is in contact with the first column spacers when the first column spacers are formed on the second substrate.

22. The liquid crystal display device according to claim 7, wherein a cross-sectional area of the upper surface of the protrusion is smaller than a cross-sectional area of the first column spacer and a height of the protrusion is shorter than the first height.

23. The liquid crystal display device according to claim 1, wherein third column spacers extend according to the data lines, respectively, and the third column spacers are separated at an intersection of the gate line and the data line.

24. The liquid crystal display device according to claim 1, wherein the third column spacers are arranged in an extension direction of the data lines and are arranged in a shape of a dotted line.

25. The liquid crystal display device according to claim 1, wherein the second height is equal to or shorter than the first height.

26. The liquid crystal display device according to claim 1, wherein the third height is equal to or shorter than the first height.

27. The liquid crystal display device according to claim 1, further comprising a common lines in parallel with the gate lines, wherein the first column spacers are formed on the gate lines, the data lines, or the common lines.

* * * * *